US010735826B2

(12) United States Patent
Ruhm et al.

(10) Patent No.: US 10,735,826 B2
(45) Date of Patent: Aug. 4, 2020

(54) FREE DIMENSION FORMAT AND CODEC

(71) Applicant: Intel Corporation, Santa Clara, CA (US)

(72) Inventors: Eyal Ruhm, Tel Aviv (IL); Asaf J. Shenberg, Tel Aviv-Jaffa (IL)

(73) Assignee: Intel Corporation, Santa Clara, CA (US)

( * ) Notice: Subject to any disclaimer, the term of this patent is extended or adjusted under 35 U.S.C. 154(b) by 246 days.

(21) Appl. No.: 15/848,255

(22) Filed: Dec. 20, 2017

(65) Prior Publication Data
US 2019/0045276 A1 Feb. 7, 2019

(51) Int. Cl.
G06K 9/00 (2006.01)
H04N 21/81 (2011.01)
H04N 19/90 (2014.01)
H04N 21/472 (2011.01)
H04N 21/6587 (2011.01)
H04N 21/218 (2011.01)
H04N 21/239 (2011.01)
H04N 19/23 (2014.01)
H04N 19/70 (2014.01)

(52) U.S. Cl.
CPC ......... *H04N 21/8146* (2013.01); *H04N 19/23* (2014.11); *H04N 19/70* (2014.11); *H04N 19/90* (2014.11); *H04N 21/21805* (2013.01); *H04N 21/2396* (2013.01); *H04N 21/47202* (2013.01); *H04N 21/6587* (2013.01); *H04N 21/816* (2013.01); *G06T 2207/10028* (2013.01); *G06T 2210/56* (2013.01)

(58) Field of Classification Search
None
See application file for complete search history.

(56) References Cited

U.S. PATENT DOCUMENTS

| | | | | | |
|---|---|---|---|---|---|
| 5,488,719 A | * | 1/1996 | Kaplan | ................. | G06K 9/6807 |
| 5,699,117 A | * | 12/1997 | Uramoto | ................. | H04N 19/70 |
| | | | | | 348/390.1 |
| 5,745,126 A | * | 4/1998 | Jain | ....................... | H04N 13/139 |
| | | | | | 382/154 |
| 5,751,865 A | * | 5/1998 | Micco | ..................... | G06T 3/602 |
| | | | | | 358/1.9 |
| 5,872,887 A | * | 2/1999 | Walker | .................. | G11B 27/028 |
| | | | | | 348/E5.043 |
| 6,282,319 B1 | * | 8/2001 | Tatsuta | .................... | G06T 9/007 |
| | | | | | 382/232 |

(Continued)

OTHER PUBLICATIONS

Xiu et al., "Delay-Cognizant Interactive Streaming of Multiview Video with Free Viewpoint Synthesis", IEEE Transactions on Multimedia, vol. 14, No. 4, Aug. 2012, pp. 1109-1126. (Year: 2012).*

(Continued)

*Primary Examiner* — Feng Niu
(74) *Attorney, Agent, or Firm* — Green, Howard & Mughal LLP.

(57) ABSTRACT

An embodiment of a semiconductor package apparatus may include technology to store a block of self-contained data including one or more time sequential frames of image data from two or more camera positions, and access a portion of the image data based on a start location and offset information from a header of the block. Other embodiments are disclosed and claimed.

20 Claims, 14 Drawing Sheets

(56) References Cited

U.S. PATENT DOCUMENTS

| | | | | |
|---|---|---|---|---|
| 6,373,803 | B2* | 4/2002 | Ando | G11B 20/1217 369/275.4 |
| 6,470,392 | B1* | 10/2002 | Murase | H04L 29/06 348/E7.07 |
| 6,680,938 | B1* | 1/2004 | Hammermeister | H04J 3/1611 370/360 |
| 6,978,083 | B2* | 12/2005 | Ando | G11B 20/1217 386/241 |
| 7,110,661 | B2* | 9/2006 | Ando | G11B 20/1217 386/330 |
| 7,145,947 | B2* | 12/2006 | Koga | H04N 5/225 375/240.01 |
| 7,212,726 | B2* | 5/2007 | Zetts | G11B 27/002 375/E7.004 |
| 8,301,793 | B2* | 10/2012 | Soroushian | G11B 27/105 709/231 |
| 8,532,194 | B2* | 9/2013 | Hannuksela | H04N 21/6437 375/240.01 |
| 8,861,550 | B2* | 10/2014 | Park | H04N 21/235 370/472 |
| 9,094,615 | B2* | 7/2015 | Aman | H04N 5/262 |
| 9,445,081 | B1* | 9/2016 | Kouperman | H04N 5/247 |
| 9,503,742 | B2* | 11/2016 | Gutierrez Novelo | H04N 19/597 |
| 9,565,449 | B2* | 2/2017 | Chen | H04N 19/597 |
| 9,977,966 | B2* | 5/2018 | Zakaluk | H04N 21/23418 |
| 10,419,737 | B2* | 9/2019 | Pang | H04N 13/282 |
| 10,430,099 | B2* | 10/2019 | Carter | G06F 3/0673 |
| 2003/0086003 | A1* | 5/2003 | Koga | H04N 5/225 348/218.1 |
| 2003/0172131 | A1* | 9/2003 | Ao | H04N 7/17318 709/219 |
| 2010/0238264 | A1* | 9/2010 | Liu | H04N 13/128 348/14.13 |
| 2010/0309287 | A1* | 12/2010 | Rodriguez | H04N 19/597 348/43 |
| 2012/0154593 | A1* | 6/2012 | Anderson | H04N 5/222 348/157 |
| 2013/0003829 | A1* | 1/2013 | Misra | H04N 19/91 375/240.12 |
| 2013/0195352 | A1* | 8/2013 | Nystad | H04N 19/197 382/166 |
| 2013/0198485 | A1* | 8/2013 | Nystad | G06F 12/0215 711/204 |
| 2013/0235152 | A1* | 9/2013 | Hannuksela | H04N 19/597 348/43 |
| 2014/0195503 | A1* | 7/2014 | Kao | H04L 67/06 707/694 |
| 2015/0172634 | A1* | 6/2015 | Wheeler | H04N 21/21805 348/47 |
| 2015/0254499 | A1* | 9/2015 | Pang | G06K 9/00208 382/103 |
| 2015/0331619 | A1* | 11/2015 | Zheng | G06F 16/00 711/154 |
| 2016/0195616 | A1* | 7/2016 | Gilliland | G01S 7/4813 356/5.01 |
| 2016/0285624 | A1* | 9/2016 | Wagh | H04B 3/46 |
| 2018/0004443 | A1* | 1/2018 | Carter | H04N 19/423 |
| 2018/0020204 | A1* | 1/2018 | Pang | H04N 19/42 |
| 2018/0089369 | A1* | 3/2018 | Semenyuk | H03M 7/30 |
| 2018/0122129 | A1* | 5/2018 | Peterson | H04N 21/854 |
| 2018/0286107 | A1* | 10/2018 | Hemmer | H04N 19/124 |
| 2019/0200029 | A1* | 6/2019 | Bangma | H04N 19/46 |

OTHER PUBLICATIONS

Tekalp et al., "3DTV over IP: End-to-end streaming of multiview video," IEEE Signal Process. Mag., vol. 24, No. 6, pp. 77-87, Nov. 2007. (Year: 2007).*

Kurutepe et al., "Client-driven selective streaming of multiview video for interactive 3DTV," IEEE Trans. Circuits Syst. Video Technol., vol. 17, No. 11, pp. 1558-1565, Nov. 2007. (Year: 2007).*

Kubota et al., "Multi-view imaging and 3DTV," IEEE Signal Process. Mag., vol. 24, No. 6, pp. 10-21, Nov. 2007. (Year: 2007).*

Tanimoto et al., "Free-viewpoint TV," IEEE Signal Process. Mag., vol. 28, No. 1, pp. 67-76, Jan. 2011 (Year: 2011).*

Chen et al., "A synthesis-quality-oriented depth refinement scheme for MPEG free viewpoint television (FTV)." In 2009 11th IEEE International Symposium on Multimedia, pp. 171-178. IEEE, 2009. (Year: 2009).*

Alexiadis et al., "Real-time, full 3-D reconstruction of moving foreground objects from multiple consumer depth cameras," IEEE Trans. Multimedia, vol. 15, No. 2, pp. 339-358, Feb. 2013. (Year: 2013).*

Mekuria et al., "Design, implementation, and evaluation of a point cloud codec for tele-immersive video." IEEE Transactions on Circuits and Systems for Video Technology 27, No. 4, Apr. 2017, pp: 828-842. (Year: 2017).*

Vedula. Image Based Spatio-Temporal Modeling and View Interpolation of Dynamic Events. PhD thesis. Carnegie Mellon University, Pittsburgh, PA, 2001. (Year: 2001).*

Vedula et al., "Image-based spatio-temporal modeling and view interpolation of dynamic events." ACM Transactions on Graphics (ToG) 24, No. 2 (2005): 240-261. (Year: 2005).*

Narayanan et al., "Constructing virtual worlds using dense stereo," in Proc. Int. Conf. Computer Vision (ICCV), 1998. (Year: 1998).*

Würmlin et al., "3D Video Recorder: a System for Recording and Playing Free-Viewpoint Video." In Computer Graphics Forum, vol. 22, No. 2, pp. 181-193. Oxford, UK: Blackwell Publishing, Inc, 2003. (Year: 2003).*

Ballan et al., "Unstructured video-based rendering: Interactive exploration of casually captured videos." ACM Transactions on Graphics (TOG) 29, No. 4 (2010): 87. (Year: 2010).*

Ye et al., "Free-viewpoint video of human actors using multiple handheld Kinects". IEEE Trans. on System, Man & Cybernetics 43, 5, 2013. (Year: 2013).*

Liu et al., "A point-cloud-based multiview stereo algorithm for free-viewpoint video". IEEE TVCG, 2010. (Year: 2010).*

Kim et al., "Outdoor dynamic 3-d scene reconstruction." IEEE Transactions on Circuits and Systems for Video Technology 22, No. 11 (2012): 1611-1622. (Year: 2012).*

Shegeda, "A GPU-based Framework for Real-time Free Viewpoint Television." Thesis, 2014. (Year: 2014).*

Ohta et al., "Live 3D video in soccer stadium." International Journal of Computer Vision 75, No. 1 (2007): 173-187. (Year: 2007).*

Price et al., "Real-time production and delivery of 3D media." In International Broadcasting Convention, Conference Proceedings. 2002. (Year: 2002).*

Vetro et al., "Overview of the stereo and multiview video coding extensions of the H.264/MPEG-4 AVC standard," Proc. IEEE, vol. 99, No. 4, pp. 626-642, Apr. 2011. (Year: 2011).*

Müller et al., "3D High-Efficiency Video Coding for multi-view video and depth data," IEEE Trans. Image Process., vol. 22, No. 9, pp. 3366-3378, May 2013. (Year: 2013).*

Merkle et al., "Efficient prediction structures for multiview video coding," IEEE Trans. Circuits Syst. Video Technol., vol. 17, No. 11, pp. 1461-1473, Nov. 2007. (Year: 2007).*

Furukawa, Y., et al., "Accurate, dense, and robust multiview stereopsis", IEEE transactions on pattern analysis and machine intelligence, vol. 32(8), pp. 1362-1376 (2010) (Year: 2010).*

Ilya Rohm et al., "Codec for Multi-Camera Compression", U.S. Appl. No. 15/848,255, dated Sep. 27, 2017, 43 pages.

Alvaro Collet et al., "High-Quality Streamable Free-Viewpoint Video", YouTube, Published Sep. 10, 2015, 2 pages.

Alvaro Collet et al., "High-Quality Streamable Free-Viewpoint Video", ACM Transactions on Graphics (SIGGRAPH), 34(4), Aug. 4, 2015, 13 pages, New York, NY.

* cited by examiner

FREE DIMENSION FORMAT AND CODEC

TECHNICAL FIELD

Embodiments generally relate to graphics systems. More particularly, embodiments relate to a free dimension format and codec.

BACKGROUND 360 degree replay technology may provide an immersive user experience for viewing sporting events. With multiple high-resolution cameras at different positions in a venue, INTEL FREED (freeD) technology may provide clear high definition images for such 360 replay. The freeD technology may use voxels (e.g., pixels with volume) to render three-dimensional (3D) replays, creating a multi-perspective view of the sports action.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
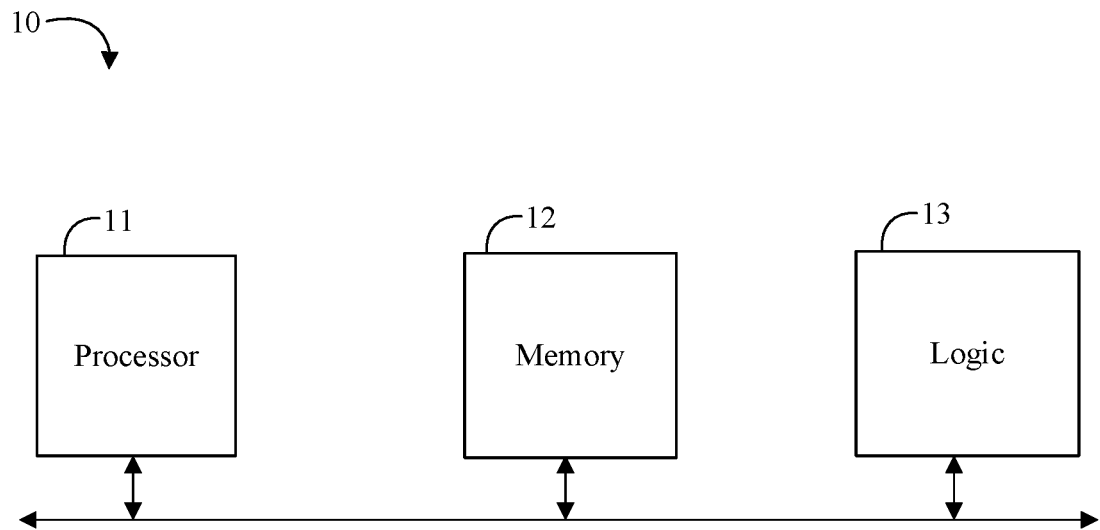
FIG. 1 is a block diagram of an example of an electronic processing system according to an embodiment.

Turning now to FIG. 1, an embodiment of an electronic processing system 10 may include a processor 11, memory 12 communicatively coupled to the processor 11, and logic 13 communicatively coupled to the processor 11 to store a block of self-contained data including one or more time sequential frames of image data from two or more camera positions, and access a portion of the image data based on a start location and offset information from a header of the block. In some embodiments, the logic 13 may be further configured to construct 3D point clouds from the one or more time sequential frames of image data for each camera position of the two or more camera positions, reproject the 3D point clouds on the two or more camera positions to separate foreground image data from background image data, store the background image data at a pre-determined camera position, and store all of the foreground image data for the two or more camera positions corresponding to a time-aligned frame to one set of image data. In some embodiments, the logic 13 may be further configured to match foreground image data between a first time-aligned frame and a second time-aligned frame, and store the matched foreground image frame at a same position in a first set of image data for the first time-aligned frame and a second set of image data for the second time-aligned frame. For example, the logic 13 may also be configured to encode foreground color information in the block of self-contained data for each of the two or more camera positions. In some embodiments, the logic 13 may be further configured to decode the block of self-contained data to build up foreground image data, and reproject the foreground image data on a 3D point cloud based on a virtual camera angle. For example, the logic 13 may also be configured to determine a closest camera position relative to a viewing angle, and interpolate a color of a scene based on stored foreground color information for the closest camera position and the viewing angle.

Embodiments of each of the above processor 11, memory 12, logic 13, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof.

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C # or the like and conventional procedural programming languages, such as the "C" programming language or similar programming languages. For example, the memory 12, persistent storage media, or other system memory may store a set of instructions which when executed by the processor 11 cause the system 10 to implement one or more components, features, or aspects of the system 10 (e.g., the logic 13, storing a block of self-contained data including one or more time sequential frames of image data from two or more camera positions, accessing a portion of the image data based on a start location and offset information from a header of the block, etc.).

Figure 2:
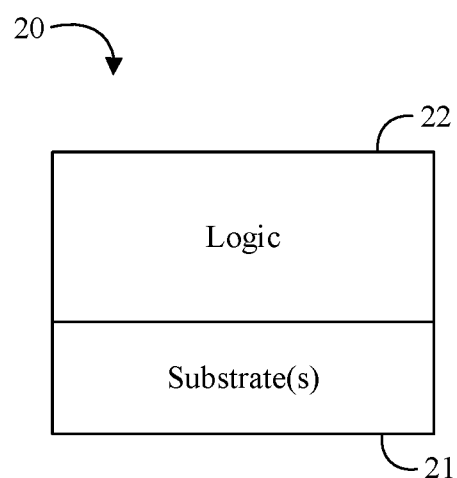
FIG. 2 is a block diagram of an example of a semiconductor package apparatus according to an embodiment.

Turning now to FIG. 2, an embodiment of a semiconductor package apparatus 20 may include one or more substrates 21, and logic 22 coupled to the one or more substrates 21, wherein the logic 22 is at least partly implemented in one or more of configurable logic and fixed-functionality hardware logic. The logic 22 coupled to the one or more substrates may be configured to store a block of self-contained data including one or more time sequential frames of image data from two or more camera positions, and access a portion of the image data based on a start location and offset information from a header of the block. In some embodiments, the logic 22 may be further configured to construct 3D point clouds from the one or more time sequential frames of image data for each camera position of the two or more camera positions, reproject the 3D point clouds on the two or more camera positions to separate foreground image data from background image data, store the background image data at a pre-determined camera position, and store all of the foreground image data for the two or more camera positions corresponding to a time-aligned frame to one set of image data. In some embodiments, the logic 22 may be further configured to match foreground image data between a first time-aligned frame and a second time-aligned frame, and store the matched foreground image frame at a same position in a first set of image data for the first time-aligned frame and a second set of image data for the second time-aligned frame. For example, the logic 22 may also be configured to encode foreground color information in the block of self-contained data for each of the two or more camera positions. In some embodiments, the logic 22 may be further configured to decode the block of self-contained data to build up foreground image data, and reproject the foreground image data on a 3D point cloud based on a virtual camera angle. For example, the logic 22 may also be configured to determine a closest camera position relative to a viewing angle, and interpolate a color of a scene based on stored foreground color information for the closest camera position and the viewing angle.

Embodiments of logic 22, and other components of the apparatus 20, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C # or the like and conventional procedural programming languages, such as the "C" programming language or similar programming languages.

Figure 3A:
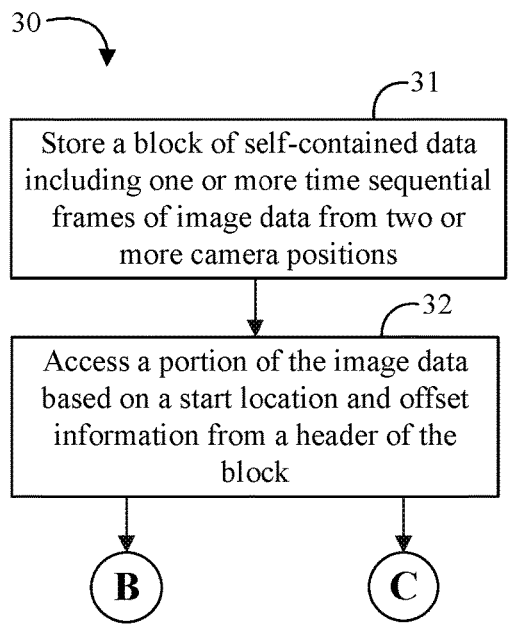
FIGS. 3A to 3C are flowcharts of an example of a method of processing image data according to an embodiment.
Figure 3C:
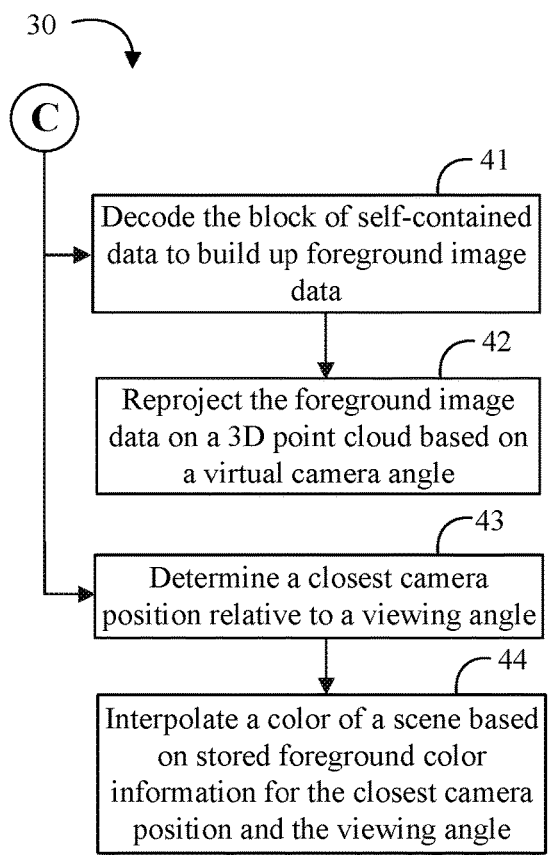
Figure 3B:
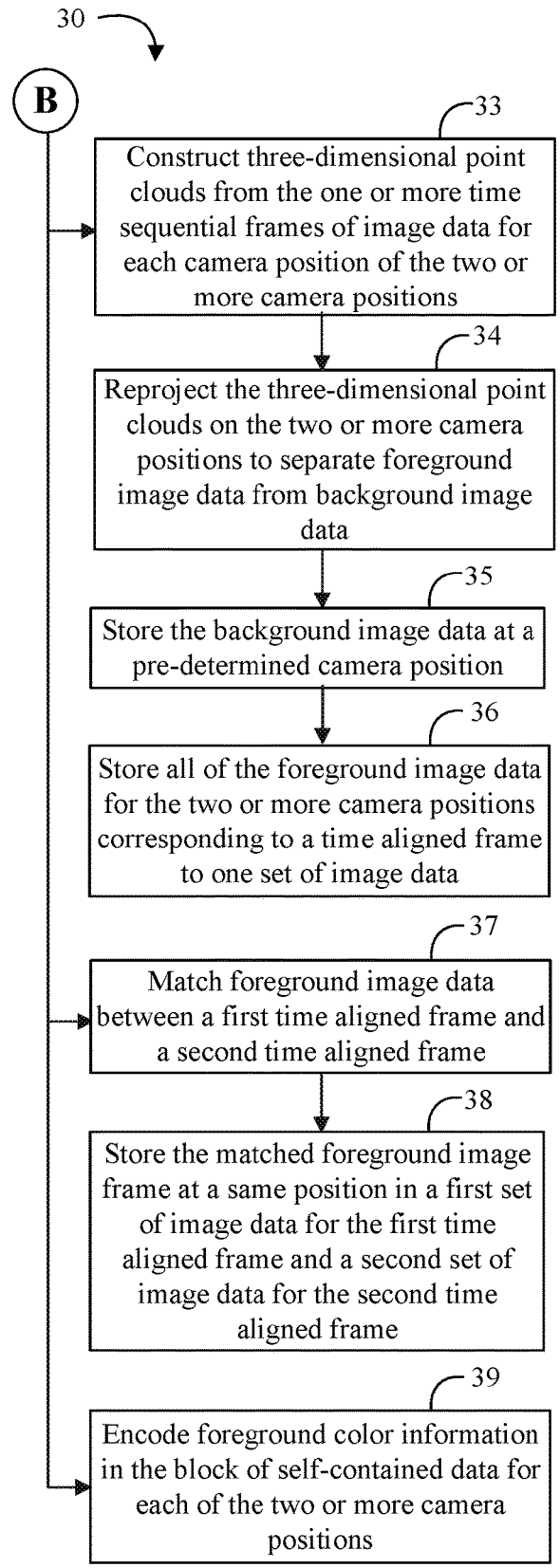

Turning now to FIGS. 3A to 3C, an embodiment of a method 30 of processing image data may include storing a block of self-contained data including one or more time sequential frames of image data from two or more camera positions at block 31, and accessing a portion of the image data based on a start location and offset information from a header of the block at block 31. Some embodiments of the method 30 may include constructing three-dimensional point clouds from the one or more time sequential frames of image data for each camera position of the two or more camera positions at block 33, reprojecting the three-dimensional point clouds on the two or more camera positions to separate foreground image data from background image data at block 34, storing the background image data at a pre-determined camera position at block 35, and storing all of the foreground image data for the two or more camera positions corresponding to a time-aligned frame to one set of image data at block 36. Some embodiments of the method 30 may also include matching foreground image data between a first time-aligned frame and a second time-aligned frame at block 37, and storing the matched foreground image frame at a same position in a first set of image data for the first time-aligned frame and a second set of image data for the second time-aligned frame at block 38. For example, the method 30 may also include encoding foreground color information in the block of self-contained data for each of the two or more camera positions at block 39.

Some embodiments of the method 30 may alternatively, or additionally, include decoding the block of self-contained data to build up foreground image data at block 41, and reprojecting the foreground image data on a 3D point cloud based on a virtual camera angle at block 42. For example, the method 30 may also include determining a closest camera position relative to a viewing angle at block 43, and interpolating a color of a scene based on stored foreground color information for the closest camera position and the viewing angle at block 44.

Embodiments of the method 30 may be implemented in a system, apparatus, computer, device, etc., for example, such as those described herein. More particularly, hardware implementations of the method 30 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 30 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C # or the like and conventional procedural programming languages, such as the "C" programming language or similar programming languages.

For example, the method 30 may be implemented on a computer readable medium as described in connection with Examples 19 to 24 below. Embodiments or portions of the method 30 may be implemented in firmware, applications (e.g., through an application programming interface (API)), or driver software running on an operating system (OS).

Figure 4:
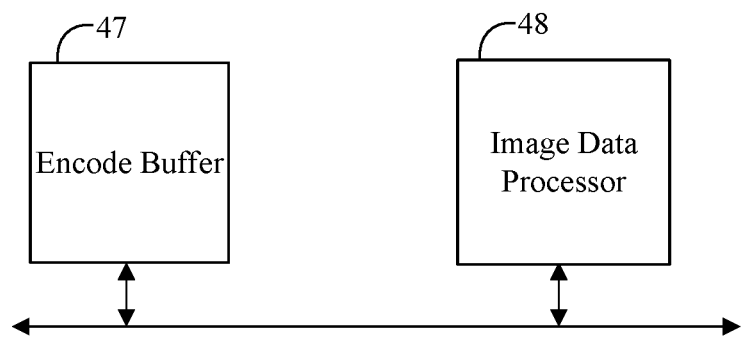
FIG. 4 is a block diagram of an example of encoder apparatus according to an embodiment.

Turning now to FIG. 4, an embodiment of an encoder 46 may include an encode buffer 47, and an image data processor 48. The encode buffer 47 may store a block of self-contained data including one or more time sequential frames of image data from two or more camera positions. The image data processor 48 may include technology to access a portion of the image data based on a start location and offset information from a header of the block stored in the encode buffer 47. In some embodiments, the image data processor 48 may be further configured to construct 3D point clouds from the one or more time sequential frames of image data for each camera position of the two or more camera positions, reproject the 3D point clouds on the two or more camera positions to separate foreground image data from background image data, store the background image data at a pre-determined camera position, and store all of the foreground image data for the two or more camera positions corresponding to a time-aligned frame to one set of image data. In some embodiments, the image data processor 48 may be further configured to match foreground image data between a first time-aligned frame and a second time-aligned frame, and store the matched foreground image frame at a same position in a first set of image data for the first time-aligned frame and a second set of image data for the second time-aligned frame. For example, the image data processor 48 may also be configured to encode foreground color information in the block of self-contained data for each of the two or more camera positions. For example, the encoder 46 may be further configured to provide the data stored in the encode buffer 47 to a transmitter (e.g., for subsequent decoding and/or viewing), and/or to save the data stored in the encode buffer 47 in a file (e.g., in a format as described below).

Embodiments of encode buffer 47, the image data processor 48, and other components of the encoder 46, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C # or the like and conventional procedural programming languages, such as the "C" programming language or similar programming languages.

Figure 5:
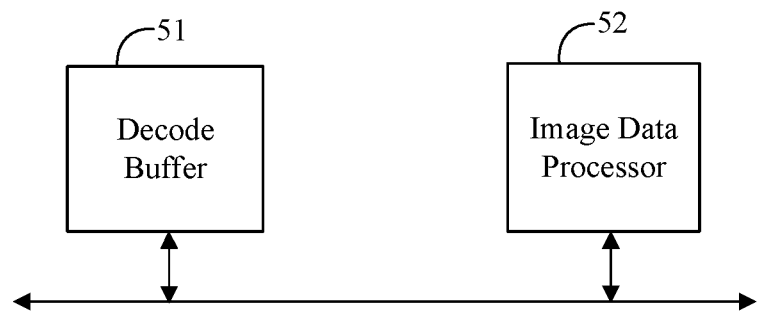
FIG. 5 is a block diagram of an example of decoder apparatus according to an embodiment.

Turning now to FIG. 5, an embodiment of a decoder 50 may include a decode buffer 51, and an image data processor 52. The decode buffer 51 may store a block of self-contained data including one or more time sequential frames of image data from two or more camera positions. The image data processor 52 may include technology to access a portion of the image data based on a start location and offset information from a header of the block stored in the decode buffer 51. In some embodiments, the image data processor 52 may be further configured to decode the block of self-contained data to build up foreground image data, and reproject the foreground image data on a 3D point cloud based on a virtual camera angle. For example, the image data processor 52 may also be configured to determine a closest camera position relative to a viewing angle, and interpolate a color of a scene based on stored foreground color information for the closest camera position and the viewing angle. The image data processor 52 may extract background image data from a pre-determined camera position and combine the foreground image data with the background image data to render a complete image. For example, the decoder 50 may be further configured to obtain the data stored in the decode buffer 51 from a receiver (e.g., from a compatible encoder), and/or to obtain the data stored in the decode buffer 51 in a file (e.g., in a format as described below). The decoder 50 may provide the decoded data to renderer to render the image data as frames for a display.

Embodiments of buffer 51, the image data processor 52, and other components of the decoder 50, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C # or the like and conventional procedural programming languages, such as the "C" programming language or similar programming languages.

Some embodiments may advantageously provide a free dimension encoder/decoder (codec) and/or file format. Free dimension may refer to graphics technology where a viewer or director may freely choose among multiple perspectives to view a 3D video. Some embodiments may be integrated with a variety of graphics system to render 3D video on different client platforms. Some embodiments may advantageously provide a codec and/or file format which allows the graphics system to access all data in a constant order of access (e.g., O(1) order), and to hold all needed types of data per frame including, for example, audio, video, 3D objects, occlusion data, metadata, etc. Some embodiments may support streaming, support encryption, and/or may run with the same data on different platforms (e.g., SONY PLAYSTATION, MICROSOFT XBOX, WINDOWS, ANDROID, etc.).

Some other systems may provide a free viewpoint video (FVV) for multi-perspective 3D video where the 3D data may be interleaved within an H264 stream and access to the data may depend on the data parsing length (e.g., a linear order of access, O(n) order). Some embodiments, may advantageously hold the 3D data and/or color data in a structure that enables constant order O(1) when accessing the data. For example, some embodiments may hold the data on one buffer per chunk (e.g., for one to N frames) with headers which point to the data. Some embodiments may provide a native binary buffer which may be read by any platform. Some embodiments may be readily written to and read from in a constant order of access. Some embodiments may divide data into multiple chunks to support streaming and/or encryption. Some embodiments may support backward compatibility, and/or may readily add new types of data per frame with corresponding new pointers.

Some embodiments may provide an image data arrangement which supports one or more benefits of the embodiments described herein. Some embodiments of the image data arrangement may be embodied in a memory structure. Some embodiments of the image data arrangement may be embodied in a file. Some embodiments may benefit from having a defined format for the image data arrangement to support compatibility between an encoder/decoder and/or to support multiple platforms. In some embodiments, a free dimension file format may advantageously work in a packeted (e.g., chunked) format with very fast access speeds. Some embodiments may also be expandable (e.g., forward and backwards compatible), and may also support expandable and modular data streams as needed to recreate volumetric video.

Some embodiments may provide a hierarchical header/data structure, and a relativistic data access approach. For example, some embodiments may support three main types of data in a file format include metadata, static assets, and dynamic assets. The metadata may include information such as headers, file specifications, and so on. Metadata may be used to ensure proper usage of information and may sometimes be static and may sometimes be dynamic. The static assets may include immutable data used in creation of the volumetric video. For example, static assets may include image/graphics data (e.g., such as a floor model) which is present in the scene but does not change throughout the scene. The dynamic assets may include temporally dependent data (e.g., per-frame information, etc.). For example, dynamic assets may include a model of a person, the audio track to a scene, the shadows cast by people, etc. as they are presented in the scene but which may be represented in a specified time.

Figure 6:
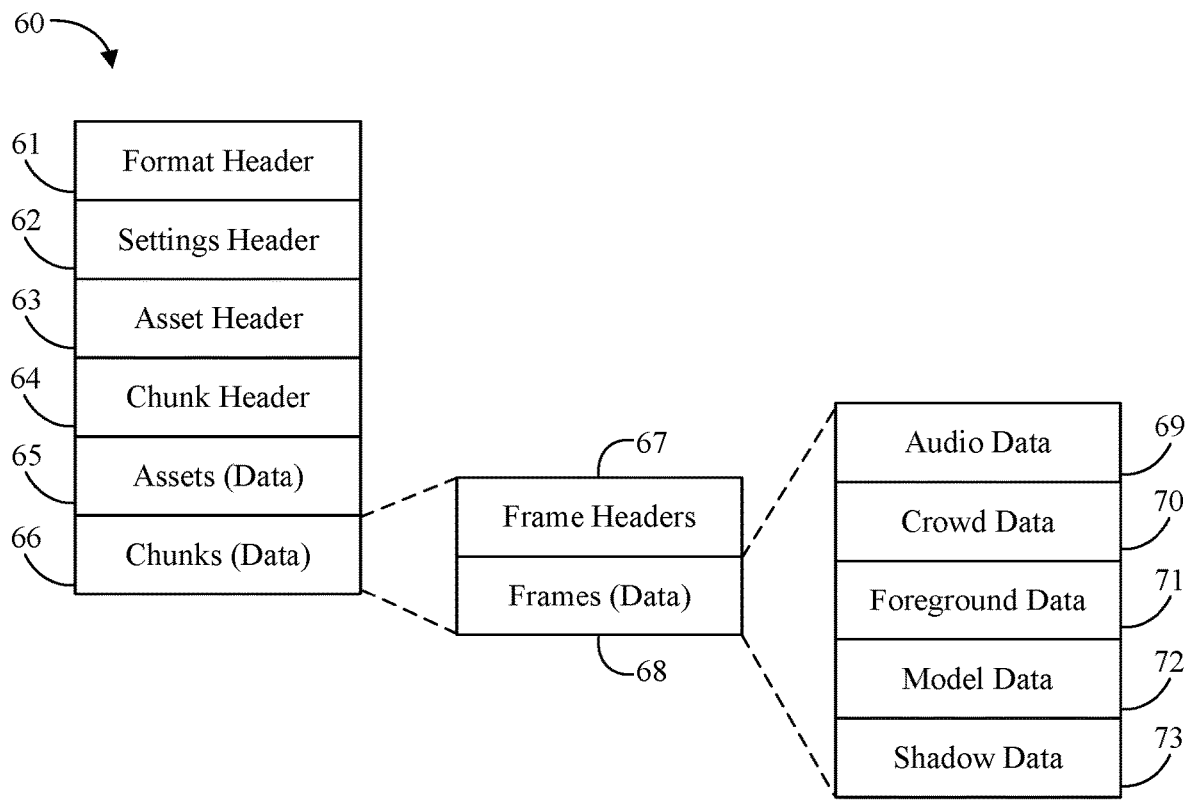
FIG. 6 is an illustrative diagram of an example of a format for a hierarchical image data arrangement according to an embodiment.

Turning now to FIG. 6, an embodiment of a format 60 for a hierarchical image data arrangement may include a format header 61, a settings header 62, asset headers 63, chunk headers 64, assets data 65 and chunks data 66. Some embodiments may store the format 60 in a container file or memory structure. Some embodiments may support data access based on a constant location plus offset structure. Each header may recreate a pointer to all data that is directly under it hierarchically such that all indexed data is O(1) order. Some embodiments may also allow for increases in header size and expanded features in the future without disrupting playback with a current decoder. An example of a format for the chunks data 66 may include frame headers 67 and frames data 68. An example of a format for the frames data 68 may include audio data 69 (e.g., a variable stream number, encoded via external format(s)), crowd data 70 (e.g., a variable stream number, encoded via AVC, HEVC, or DDS), foreground data 71 (e.g., a variable stream number, encoded via AVC, HEVC, or DDS), model data 72 (e.g., a point cloud or mesh, compressed or uncompressed), and shadow data 73 (e.g., multiple stream numbers, encoded via AVC, HEVC, or DDS).

The format header 61 may be the only non-pointed structure in the format 60. Because the format header 61 is located at the very start of the file (e.g., or other memory structure), the format header 61 may have an implicit location (e.g., start location=start of file, offset=0). The format header may include entries for one or more of a major version (e.g., major version of an encoder used in creation of the file), minor version (e.g., minor version of the encoder used in creation of the file), format header size (e.g., a size of the format header as defined when written), settings header size (e.g., a size of the settings header as defined when written), assets header size (e.g., a size of an asset header as defined when written), chunk header size (e.g., a size of a chunk header as defined when written), FgVideoStreams (e.g., a number of video streams used for foreground), BgVideoStreams (e.g., a number of video streams used for background), AudioStreams (e.g., number of audio streams used), settings offset (e.g., an offset of the settings header from start of file), assets header array offset (e.g., an offset of the asset headers from start of file), and chunk header array offset (e.g., an offset of the chunk headers from start of file).

The settings header 62 may be pointed to by the settings offset from the start of the file, as defined in the format header 61. The settings header 62 may contain data which holds a specific encoded file. The structure of the settings header may be as follows in Table 1:

TABLE 1

Structure of the Settings Header

| Field | Name | Description |
| --- | --- | --- |
| 1 | Input width | Width of input |
| 2 | Input height | Height of input |
| 3 | Foreground width | Foreground data width |
| 4 | Foreground height | Foreground data height |
| 5 | Background width | Background data width |
| 6 | Background height | Background data height |
| 7 | Atlas Scale Factor | Input rescaling factor |
| 8 | Number of foreground frames | Number of frames of foreground data in current file |
| 9 | Number of shadow frames | Number of frames of shadow data in current file |
| 10 | Number of crowd frames | Number of frames of crowd data in current file |
| 11 | First frame number | Number of first frame for current file (for multi-file encoding) |
| 12 | Number of foreground cameras | Number of cameras for which foreground data exists |
| 13 | Number of points in cloud | Upper limit of vertices in a point cloud |
| 14 | Mapping LUT resolution | Look-up-table (LUT) divisor for atlas/foreground blocks |
| 15 | Number of background cameras | Number of cameras for which background data exists |
| 16 | List of background cameras | Accessor for background information |
| 17 | baked point shadow size | Occlusion variable |
| 18 | baked particle size factor | Occlusion variable |
| 19 | shadow bias | Occlusion variable |
| 20 | Project type | Platform identification |
| 21 | Foreground bitrate | Foreground data bitrate per stream |

TABLE 1-continued

Structure of the Settings Header

| Field | Name | Description |
|---|---|---|
| 22 | Background bitrate | Background data bitrate per stream |
| 23 | Output framerate | Base framerate |
| 24 | Video codec | Video platform definition |
| 25 | isH265 | Is video using HEVC encoding |
| 26 | isDDS | Is data based around direct draw surface (DDS) block compression (DXT1) encoding |
| 27 | isMesh | Is model data mesh/point cloud based |
| 28 | isMeshCompressed | Is extra compression used |
| 29 | Number of foreground video streams | Sets division of foreground data |
| 30 | Number of shadow video streams | Sets division of shadow data |
| 31 | Number of crowd video streams | Sets division of crowd data |
| 32 | Number of audio streams | Sets division of audio data |
| 33 | GOP frames | Number of frames in group of pictures (GOP) |
| 34 | Frames per chunk | Number of frames per chunk |
| 35 | Background of clean foreground red level | Base background color for foreground data |
| 36 | Background of clean foreground green level | Base background color for foreground data |
| 37 | Background of clean foreground blue level | Base background color for foreground data |
| 38 | LUT Compression type | Selector value for look up table compression |
| 39 | Number of assets | Number of assets in file |
| 40 | Point size factor | Size of vertex (for rendering) |

Figure 7:
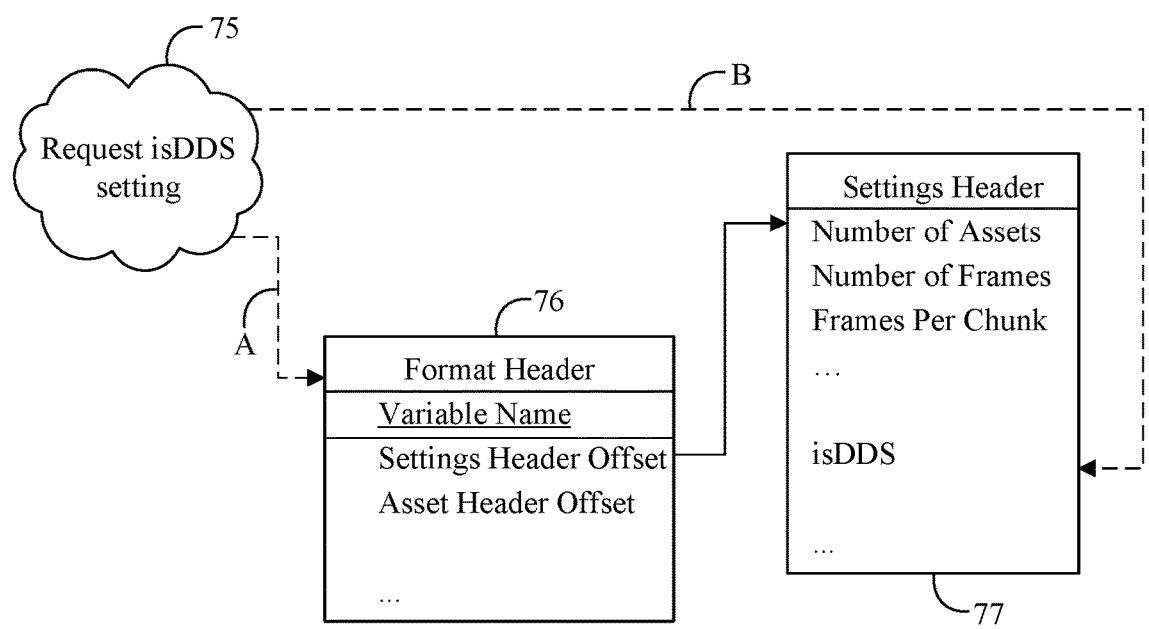
FIG. 7 is an illustrative diagram of an example of a static metadata access according to an embodiment.

Turning now to FIG. 7, an example of a static metadata access may use an embodiment of the hierarchical and offset based structure. A request to access the isDDS field may occur at block 75. The attempt to access the isDDS field while decoding may require access to that field in the settings header 77. In order to derive the location, the format header 76 may first be accessed, where the format header 76 may contain the offset of the settings header 77. Using the settings header offset, the location of the settings header 77 may be determined, and the request for the data may then access the isDSS field in the settings header 77. The order of request may be indicated by the arrow A (e.g., location of settings), followed by the arrow B (e.g., specific data). The access to the format header 76 and the settings header 77 may both be simple, constant time actions, and many changes may be made to both the format header 76 and the settings header 77 without the encode/decode functionality being impaired in any way.

Asset headers may be pointed to by the asset header array offset from the start of the file, as defined in the format header. Each asset header may be defined around one static asset that is used for the entire set. For each asset header, up to the number of assets defined in the settings header, the structure may include an asset offset (e.g., an offset of asset data from the beginning of the file), an asset size (e.g., a size of the asset), and an asset name (e.g., an identifier for the asset). Chunk headers may be pointed to by the chunk header array offset from the start of the file, as defined in the format header. Each chunk header may be defined around one chunk of a predefined number of frames according to the number of frames and the frames per chunk as defined in the settings header. A chunk may be set to be temporal-dependent data. For each chunk header, the structure may include a chunk offset (e.g., an offset of the chunk data from the beginning of the file), and frames-in-chunk (e.g., a number of frames in the defined chunk).

Figure 8:
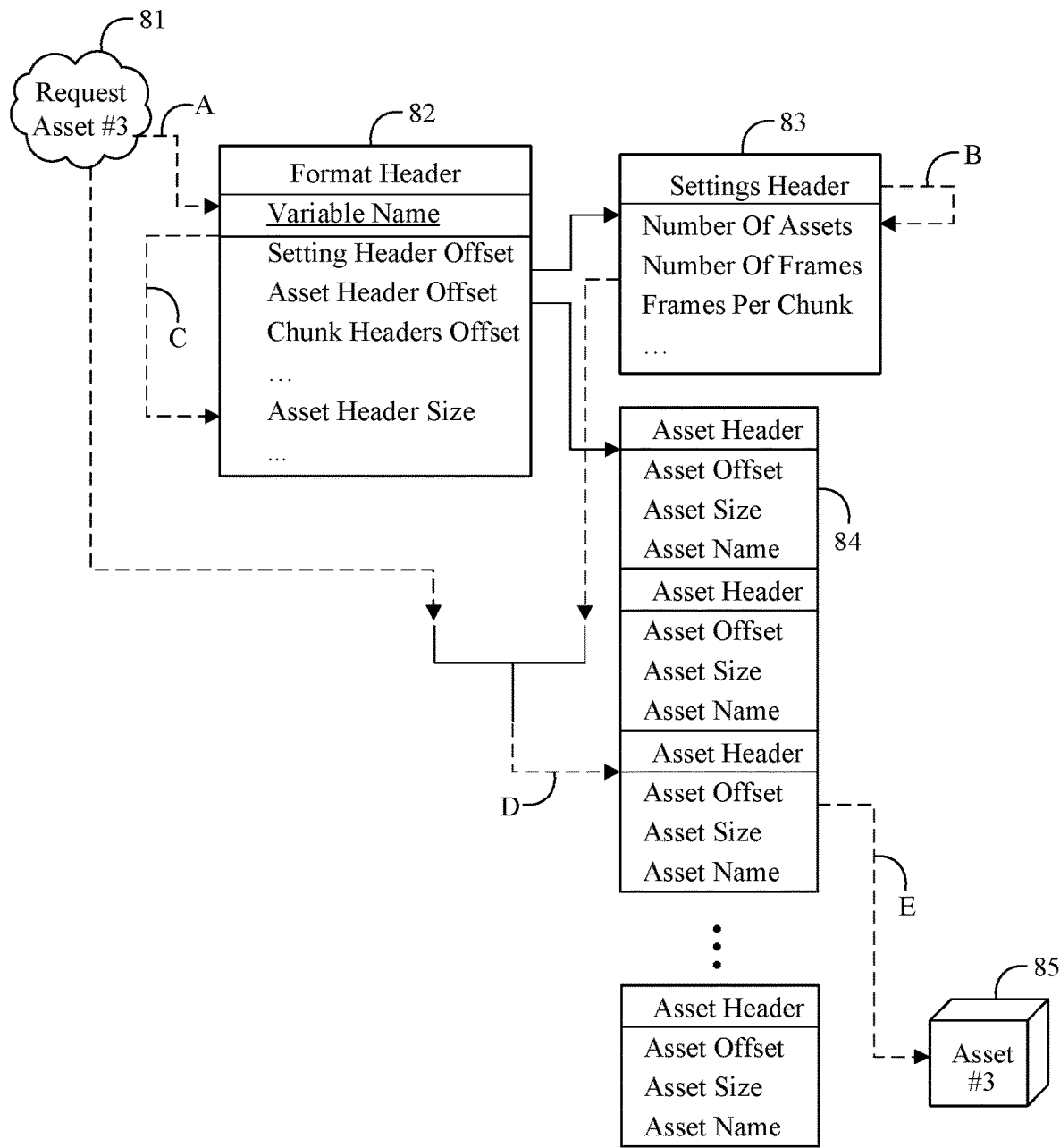
FIG. 8 is an illustrative diagram of an example of a static asset access according to an embodiment.

Turning now to FIG. 8, an example of a static asset access may use an embodiment of the hierarchical and offset based structure to improve security and modularity. Each asset may be identified according to the asset identifier as specified in the asset header 84 (e.g., when a specific asset is needed), or according to the order in assets (e.g., when iterating through assets). The static asset data may not be changed nor become more or less relevant at any point. As such, all static asset data may be accessed through the asset offset as defined by the matching asset header (e.g., according to identifier) from the start of the file, for the given asset length (in bytes) according to the same header. A request to access a specific static asset at block 81 may need the location of the asset which appears in the asset header 84. Because the size of the asset header 84 may change between versions, both the offset of the first asset header and the size of an asset header may be accessed from the format header 82, while the number of assets may be accessed via the settings header 83. The request may be verified (e.g., that the request is authorized/permitted), and the asset header numbered according to the request may be determined. From the asset header 84, the actual location of the asset 85 may be determined. The order of processing the request may be indicated by the arrows A, B, and C (e.g., asset header data), followed by the arrow D (e.g., specific asset header request), followed by the arrow E (e.g., data access). Some embodiments may add another indirect access layer to data access, which may advantageously provide verification and support for a flexible data format, as well as no limits to static assets.

Some embodiments of the hierarchical and offset based structure may include dynamic data and/or headers. For chunk data, for example, each chunk may be a block of self-contained dynamic data. Chunk data may be divided into multiple frames. Each piece of chunk data may be accessed via the file start location plus the chunk offset from the specific chunk header related to that piece of chunk data. Each piece of chunk data may contain the number of frames specified in the corresponding chunk header. The structure of chunk data may include frame headers and frame data.

The frame headers of the chunk data may include an array of frame headers. The size of each frame header may be specified in the format header such that, even when frame headers are changed, the frame header may be accessed both directly and via an iterative process. Each header may be dynamically sized, with all offsets being defined as from the start of the specific frame header. The static part may be the first set of foreground/shadow/crowd/audio offsets and sizes, followed by per-stream data which may change according to the number of streams for each data type. Some data may not necessarily be available each frame. In such cases, the offset and size may be defined to be zero. The frame header structure may be as follows in Table 2:

TABLE 2

Structure of Frame Header

| Field | Name | Description |
|---|---|---|
| 1 | Foreground Data offsets | Offset to the location of offsets per each stream of foreground data |
| 2 | Shadow Data offsets | Offset to the location of offsets per each stream of shadow data |
| 3 | Crowd Data offsets | Offset to the location of offsets per each stream of crowd data |
| 4 | Audio Data offsets | Offset to the location of offsets per each stream of audio data |
| 5 | LUT offset | Offset to LUT data |
| 6 | Model offset | Offset to volumetric data |
| 7 | Foreground Data sizes | Offset to the location of sizes per each stream of foreground data |
| 8 | Shadow Data sizes | Offset to the location of sizes per each stream of shadow data |
| 9 | Crowd Data sizes | Offset to the location of sizes per each stream of crowd data |
| 10 | Audio Data sizes | Offset to the location of sizes per each stream of audio data |
| 11 | LUT size | Size of LUT data |
| 12 | Model size | Size of volumetric data |
| 13 | Actual Foreground Data offsets | An array of offsets to current frame's foreground data |
| 14 | Actual Foreground Data sizes | An array of sizes of current frame's foreground data |
| 15 | Actual Shadow Data offsets | An array of offsets to current frame's shadow data |
| 16 | Actual Shadow Data sizes | An array of sizes of current frame's shadow data |
| 17 | Actual Crowd Data offsets | An array of offsets to current frame's crowd data |
| 18 | Actual Crowd Data sizes | An array of sizes of current frame's crowd data |
| 19 | Actual Audio Data offsets | An array of offsets to current frame's audio data |
| 20 | Actual Audio Data sizes | An array of sizes of current frame's audio data |

The frame data may be accessible in one of two ways. If the type of frame data is unique to frames, then the frame data may be accessed by adding the offset as defined in the frame header to the start of the relevant frame header. Otherwise, the frame data may be defined as multiple stream data, and the offset from the frame header's start may be pointed at by the offset as defined in the frame header after adding the stream number. Sizes may be similarly accessed. The format itself is not limited to specific types of encoding, whether they be video, images, compressed (via any schema), or otherwise, as long as it contains a temporal separation. The structure, order, and other image data may vary as defined by the format and settings header, as well as the frame headers. The only limit is that the frame data comes after the frame headers and inside the relevant chunk. The frame headers and corresponding frame data may be specified via encode. The types of frame data contained may include foreground data (e.g., metadata to expand the volumetric model), shadow data (e.g., data as to the projected shadows onto the static scene), crowd data (e.g., data as to how the crowd is seen), audio data (e.g., scene audio), LUT data (e.g., an access table to connect angle/viewing data into the proper streams such that it can be used in an optimal way), and volumetric model data (e.g., the dynamic volumetric data).

Figure 9:
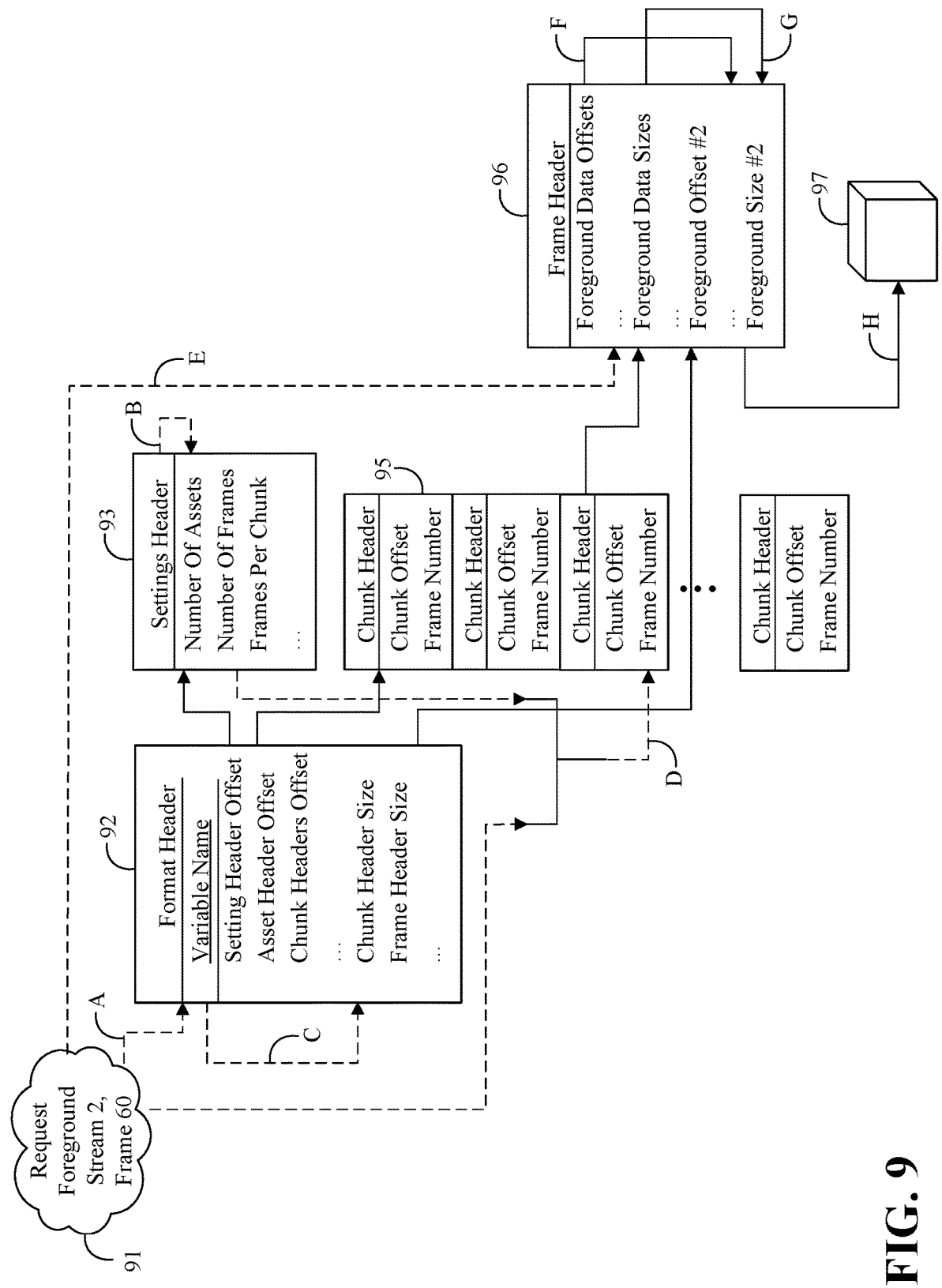
FIG. 9 is an illustrative diagram of an example of a frame data access according to an embodiment.

Turning now to FIG. 9, an example of a frame data access may use an embodiment of the hierarchical and offset based structure. A data access may request a specific bit of foreground information from a specific frame at block 91. A specific chunk header 95 may be identified using the format header at block 92 and the settings header 93, then access the proper chunk header 95, and from there the relevant chunk data 96. From the chunk data 96, the specific frame header needed may be determined, and because it is a variable-stream data, the access to the specific piece of foreground data 97 may be pointed at from the earlier part of the frame header, from which the foreground data 97 may be accessible. The order of processing the request may be indicated by the arrows A, B, and C (e.g., chunk header data), followed by the arrows D and E (e.g., specific chunk header and then frame header request), followed by the arrows F and G (e.g., finding the location of the specific data), followed by the arrow H (e.g., data access). The hierarchy may support complex and flexible data access. Some embodiments may allow not only for different chunk and frame headers in the future without changing the decoder, but also allow for use of a variable number of streams for data.

An example environment according to some embodiments may include a sports venue (e.g., a stadium, an arena, etc.) having multiple high-resolution cameras aimed in coordinated positions to capture images of the sports event. A free dimension encoder may encode multiple frames which allow a viewer to choose what to see and from where in the stadium (e.g., including on the field/court from the perspective of a player/coach/referee). All data needed to create free dimensional clips to view the scene may be included in the encoded information. An immersive application may effectively allow a viewer to walk around on the field/court while the sports event is replaying (e.g., some embodiments may not have enough compute performance/resources for real-time viewing but may provide such an experience shortly afterwards). In some embodiments, the encoded information may be provided to a cloud/server environment to create free dimensional server clips which may be broadcast or served to clients on demand. A director may choose what 2D clips to create for download a single frame at a time (e.g., to save network bandwidth).

Figure 10:
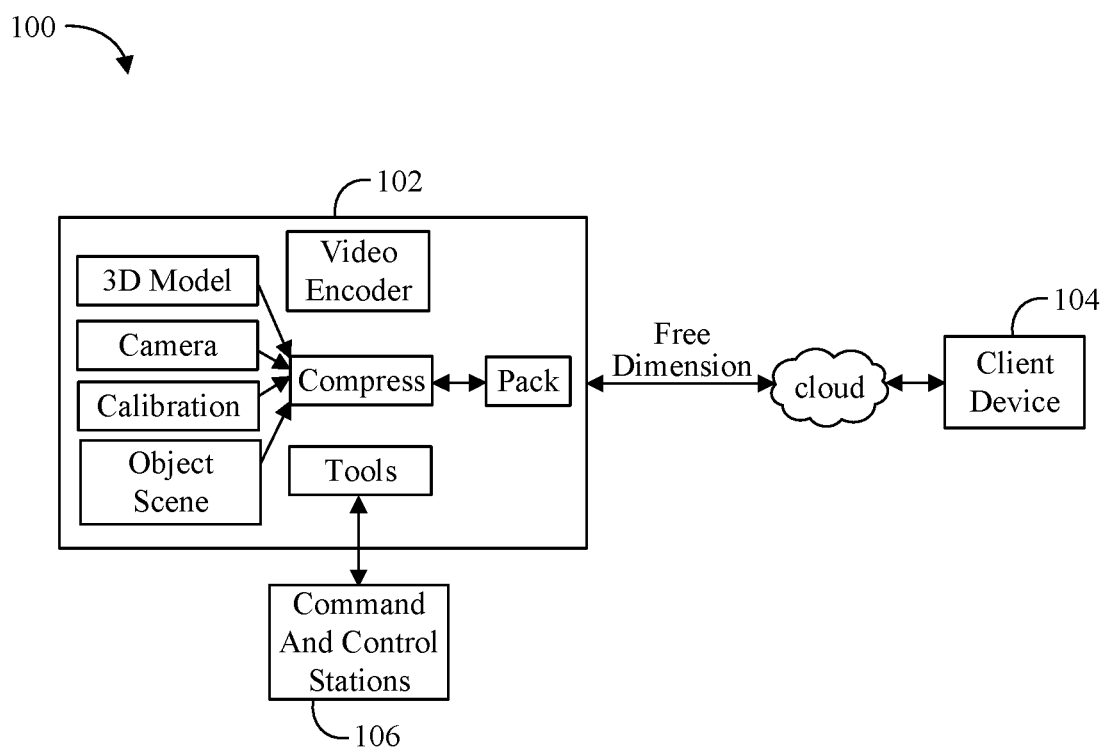
FIG. 10 is an illustrative diagram of an example of a free dimension video environment including a 3D encoder according to an embodiment.

Turning now to FIG. 10, an embodiments of a free dimension video environment 100 may include a 3D encoder 102 that includes a combination of hardware and software to implement a video encoder that receives video data (e.g., 3D models, camera information, calibration information, object scene information, etc.), compresses the video data, and packs the compressed data for use by a client device 104 (e.g., a desktop computer, a laptop computer, a tablet computer, a head mounted display, etc.). The 3D encoder 102 may also include a tool interface to one or more command and control stations 106.

Figure 11A:
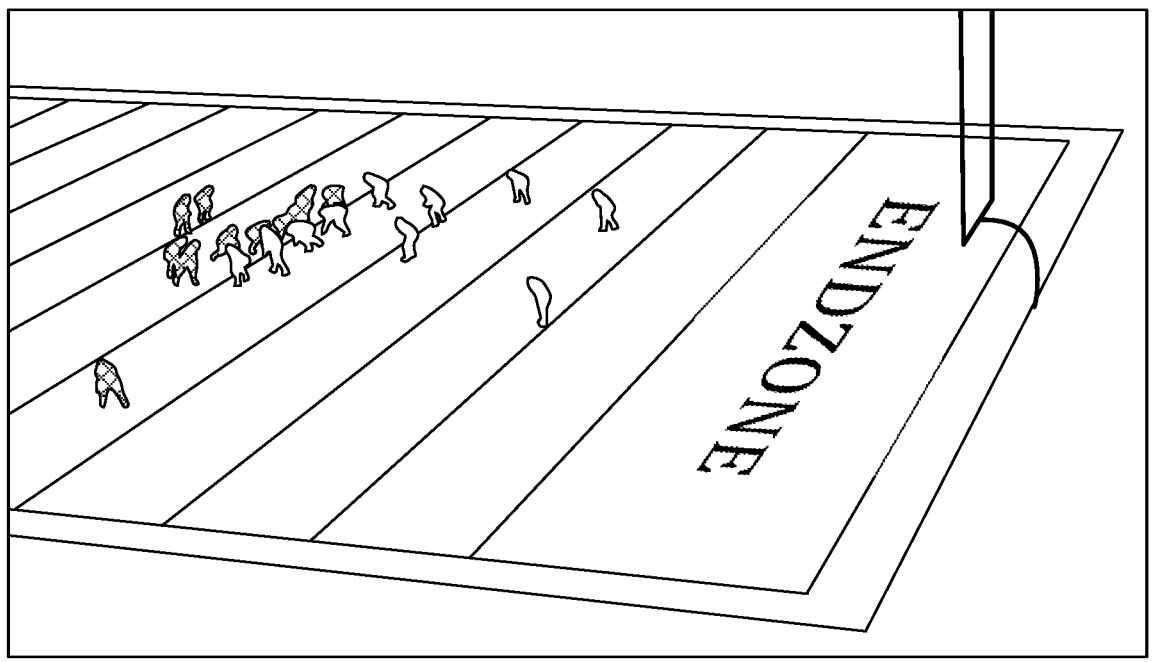
FIGS. 11A and 11B are illustrative diagrams of example images captured by a free dimension video system according to an embodiment.
Figure 11B:
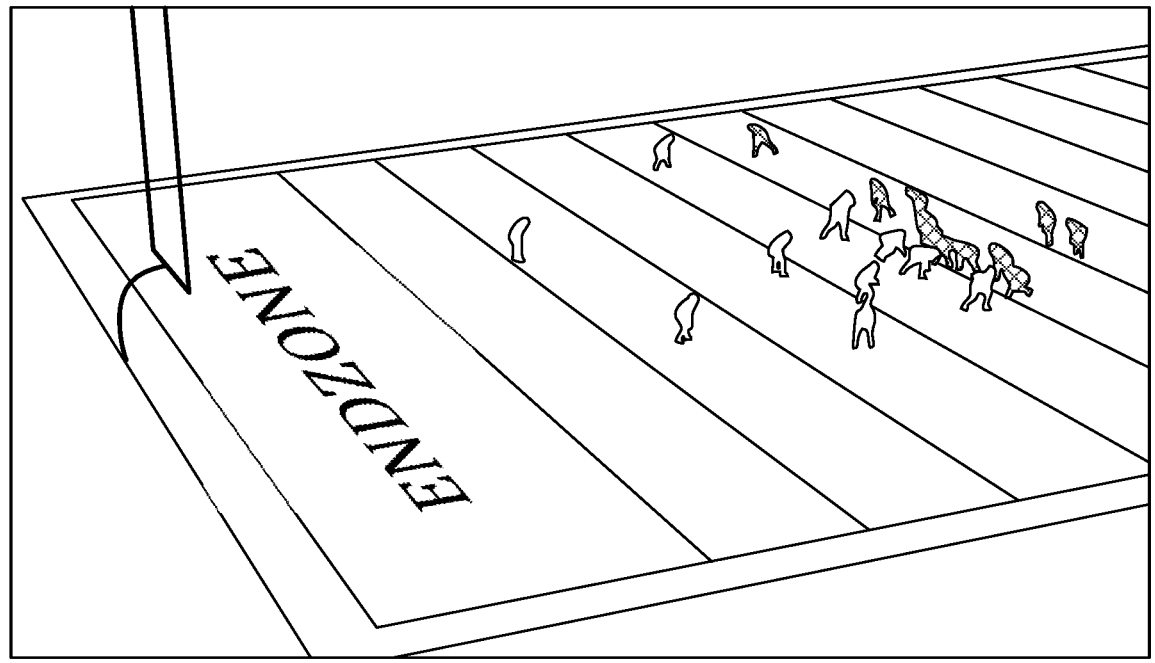

Turning now to FIGS. 11A and 11B, example images captured by an embodiment of a free dimension video system may include 36 synced cameras having 5K resolution located in a football stadium aimed to the same place recording the scene in 30 FPS from multiple perspectives (e.g., the bit rate is 5K×3K=45 MB per image×36 cameras× 30 fps=48 GBps×8 bit=388 gbps=0.388 Tbps).

Figure 12A:
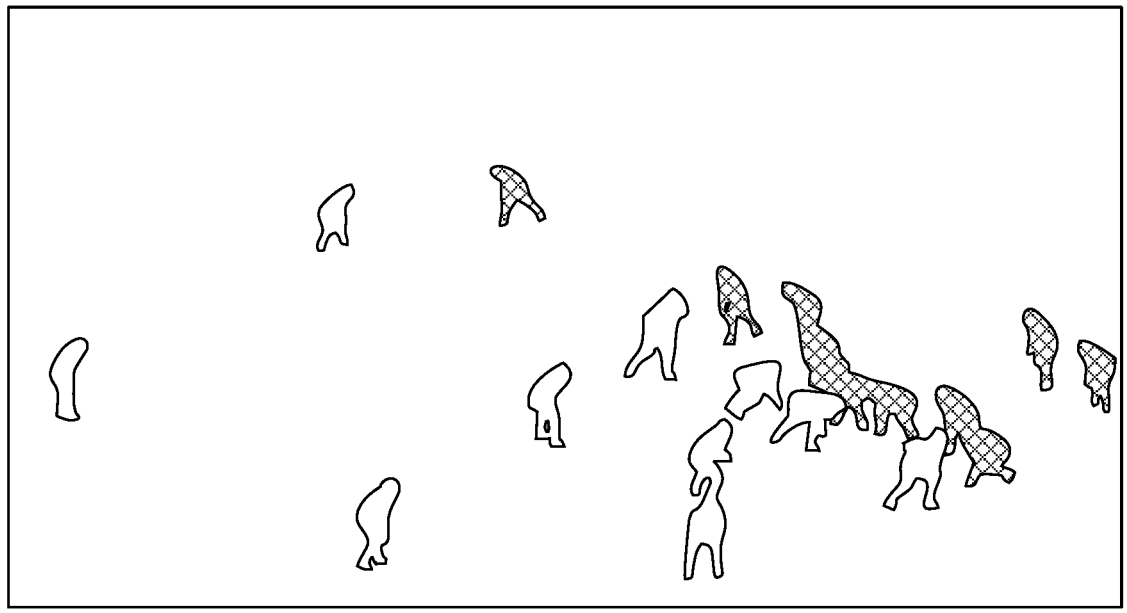
FIGS. 12A to 12C are illustrative diagrams of example foreground and background image data according to an embodiment.
Figure 12B:
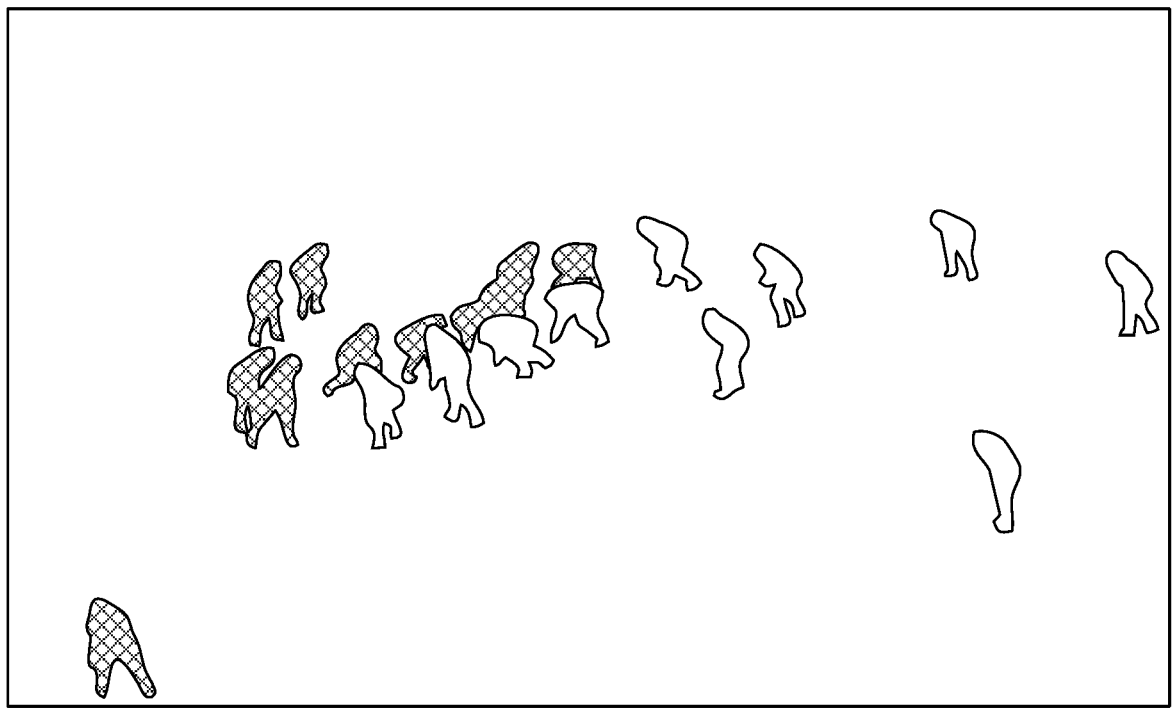
Figure 12C:
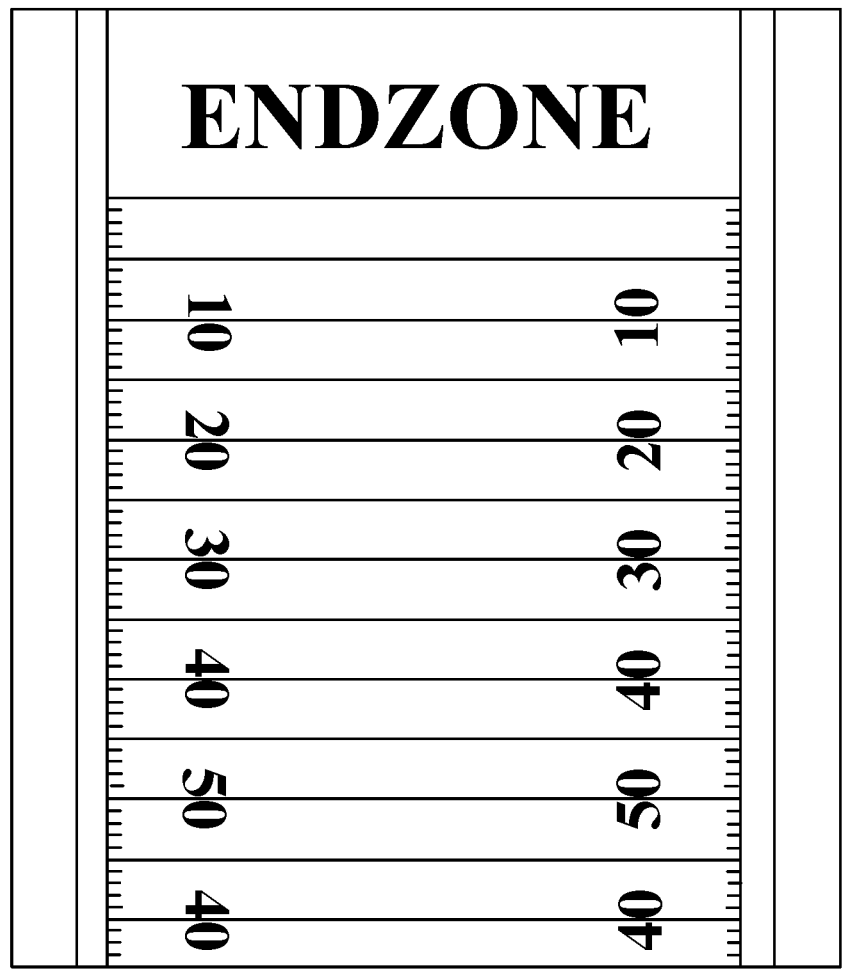

Turning now to FIGS. 12A to 12C, example foreground and background image data show may be extracted by an embodiment of a free dimension video system. Some embodiments may process the video data to reconstruct 3D point clouds from the scene for each frame (30 fps). With the 3D point cloud the system may separate the foreground from the background, and reproject the point cloud on the original cameras and extract the foreground. For example, FIG. 12A may represent the foreground information extracted from FIG. 11A, FIG. 12B may represent the foreground information extracted from FIG. 11B, and FIG. 12C may represent the background information. The background may be processed and transferred to a camera zero (0) position.

Figure 13:
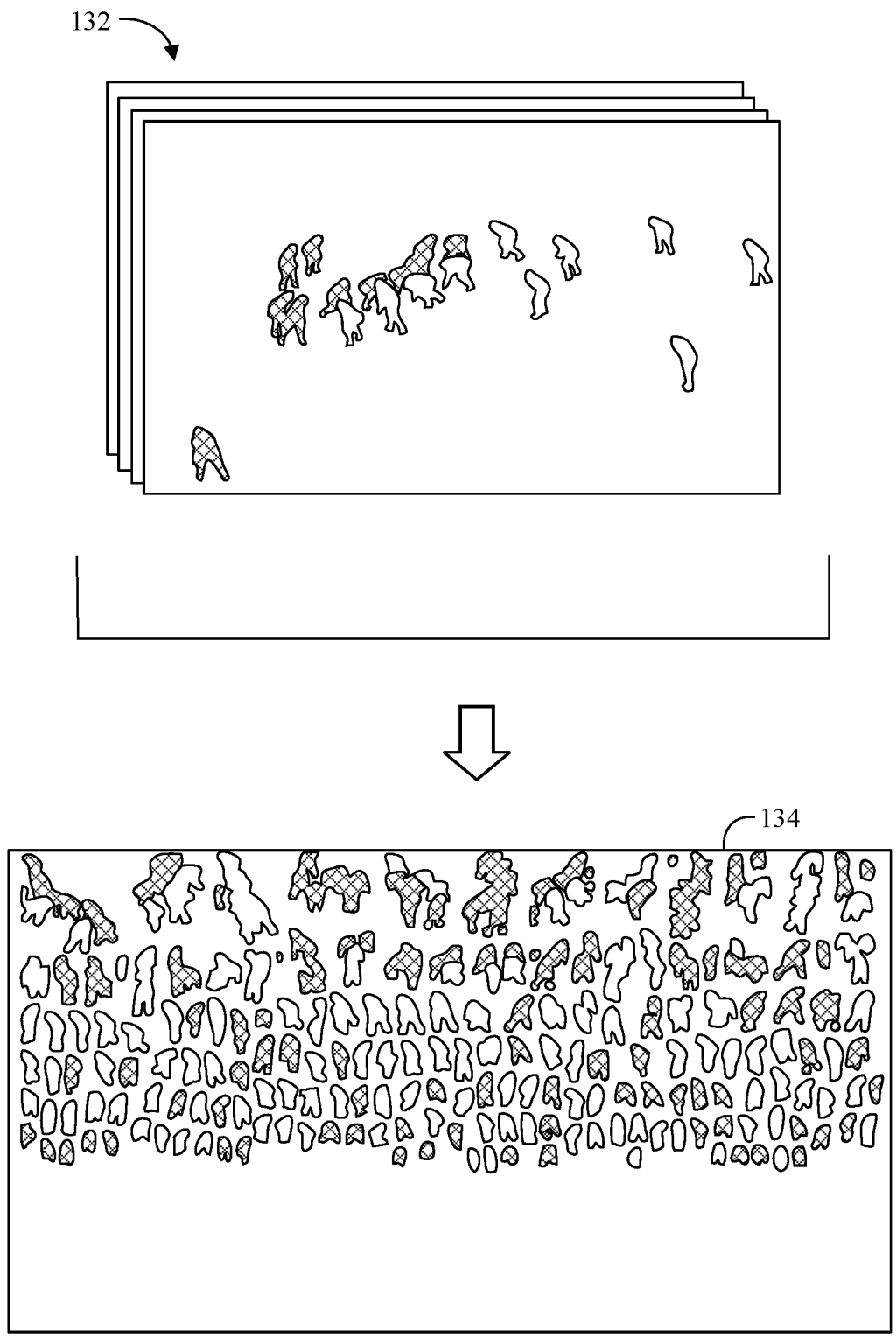
FIG. 13 is an illustrative diagram of an example set of foreground image data merged to create an atlas according to an embodiment.

Turning now to FIG. 13, an example set of foreground image data 132 may be merged to create an atlas 134. For example, the multiple cameras of the system may provide a synced frame from each camera resulting in a set of time-aligned foreground image data 132. The system may then aggregate the foreground image data from all the foreground images of one set of time-aligned frames to one atlas 134. An atlas may refer to an image which contains the foreground from all images of one time-aligned frame. The number of frames included in the set 132 may depend on the atlas size. For performance/bandwidth considerations, for example, some number of cameras less than the total number of available cameras may be selected to be included in the atlas 134. For example, 20 of the 36 cameras that are closest to the scene of interest may be included in the set 132 that is combined in the atlas 134.

Another atlas may be created for the next sequential synced frame of the cameras, and so on. Some embodiments may then compress the atlas stream to an H264/5 stream. Some embodiments may advantageously utilize object and/or feature matching to keep the players in the same position of the atlas to compress the foreground in better quality. For example, tracking down the players in the foreground image data and keeping them in the same position in the atlas may achieve better quality after H264/5 compression and may significantly compress the data (e.g., by about 50×).

Figure 14:
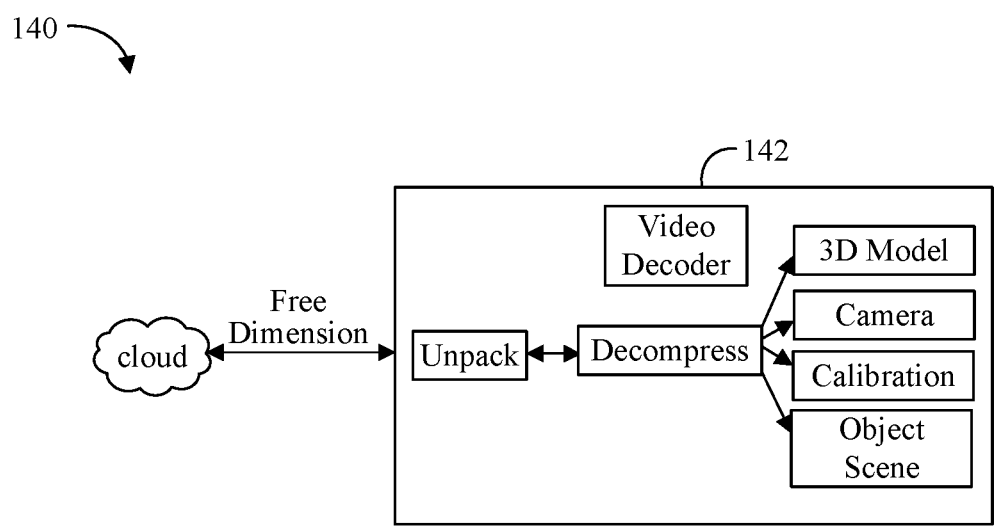
FIG. 14 is an illustrative diagram of an example of a free dimension video environment including a 3D decoder according to an embodiment.

Turning now to FIG. 14, a free dimension viewing environment 140 may include a 3D decoder 142 that includes a combination of hardware and software to implement a video decoder that receives packed video data (e.g., 3D models, camera information, calibration information, object scene information, etc.), unpacks the received data, and decompresses the video data for rendering by a client device. Some embodiments may decode the H264/5 stream and the 3D cloud points directly to the GPU. From the decoded atlases, the renderer may build up the original foreground images using look up tables which hold the original locations of the figures in the atlas. The renderer may then reproject the foreground images back on the 3D point cloud based on a virtual camera angle (e.g., the angle that the client is watching the scene). The renderer may interpolate the colors from the closest camera positions in order to paint the scene correctly taking into consideration the viewing angle.

In some other multi-perspective 3D systems, each surface of the mesh may have only one color, coded at the encoder. A problem with these other systems is that the colors of the mesh do not change with the view angle, which degrades the user experience. Some embodiments may advantageously color the scene in real-time based on the virtual camera angle during the render process. Some embodiments may use an interpolation from the closest cameras to be able to paint the scene correctly taking into consideration the viewing angle. Some embodiments may encode the foreground colors for each camera using the atlas to provide the color information from many directions.

Figure 15:
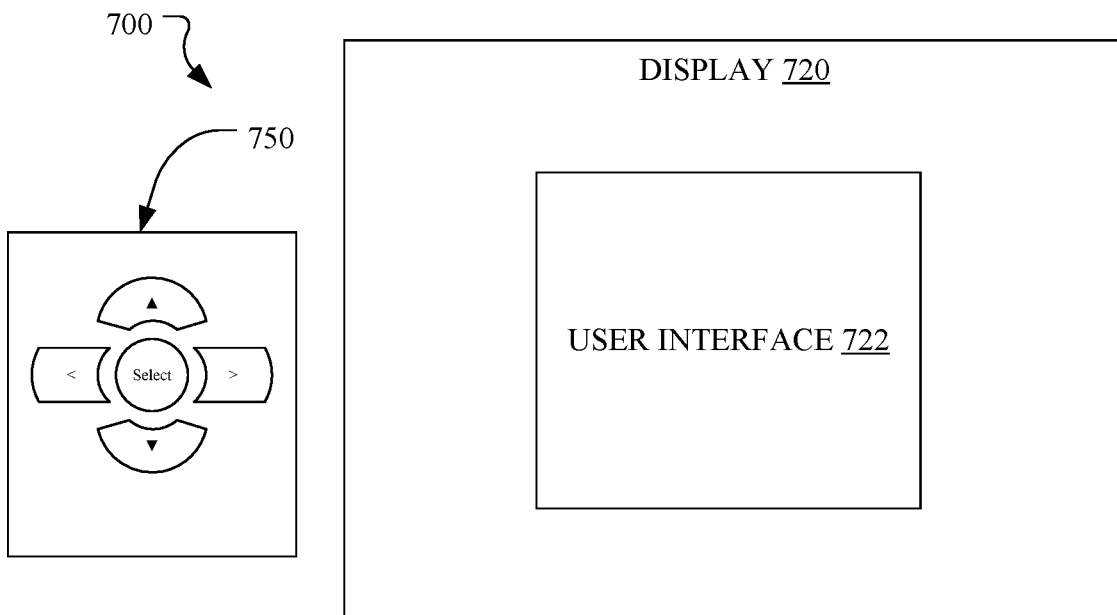
FIG. 15 is a block diagram of an example of a system having a navigation controller according to an embodiment.
Figure 15:
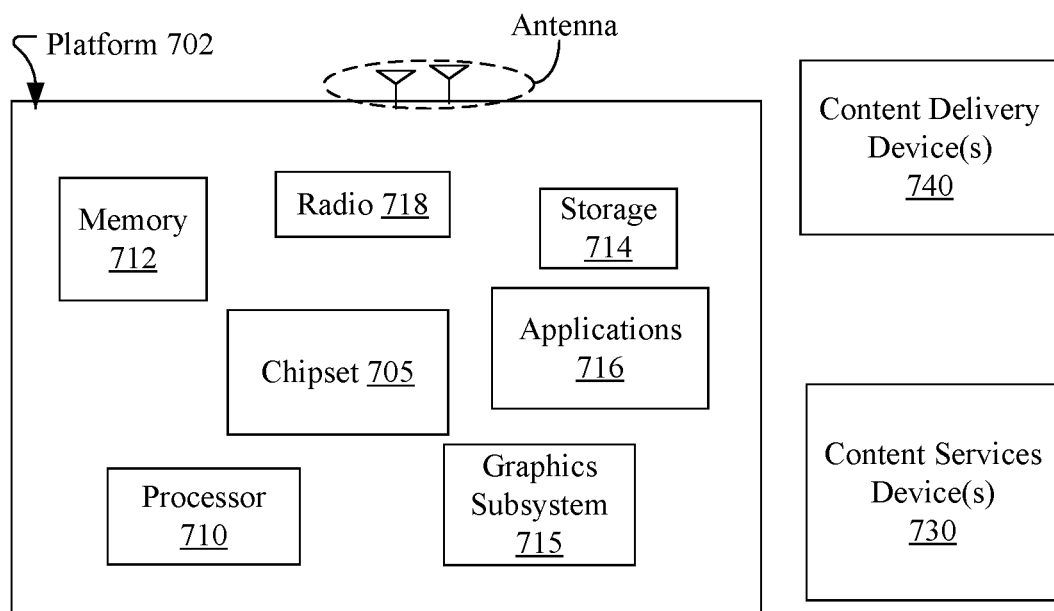

FIG. 15 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, the system 700 comprises a platform 702 coupled to a display 720 that presents visual content. The platform 702 may receive video bitstream content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, the platform 702 may comprise any combination of a chipset 705, processor 710, memory 712, storage 714, graphics subsystem 715, applications 716 and/or radio 718 (e.g., network controller). The chipset 705 may provide intercommunication among the processor 710, memory 712, storage 714, graphics subsystem 715, applications 716 and/or radio 718. For example, the chipset 705 may include a storage adapter (not depicted) capable of providing intercommunication with the storage 714.

The processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, the processor 710 may comprise dual-core processor(s), dual-core mobile processor(s), and so forth.

The memory 712 may be implemented as a volatile memory device such as, but not limited to, a Random Access Memory (RAM), Dynamic Random Access Memory (DRAM), or Static RAM (SRAM).

The storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

The graphics subsystem 715 may perform processing of images such as still or video for display. The graphics subsystem 715 may be a graphics processing unit (GPU) or a visual processing unit (VPU), for example. An analog or digital interface may be used to communicatively couple the graphics subsystem 715 and display 720. For example, the interface may be any of a High-Definition Multimedia Interface (HDMI), DisplayPort, wireless HDMI, and/or wireless HD compliant techniques. The graphics subsystem 715 could be integrated into processor 710 or chipset 705. The graphics subsystem 715 could be a stand-alone card communicatively coupled to the chipset 705. In one example, the graphics subsystem 715 includes a noise reduction subsystem as described herein.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

The radio 718 may be a network controller including one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, the display 720 may comprise any television type monitor or display. The display 720 may comprise, for example, a computer display screen, touch screen display, video monitor, television-like device, and/or a television. The display 720 may be digital and/or analog. In embodiments, the display 720 may be a holographic display. Also, the display 720 may be a transparent surface that may receive a visual projection. Such projections may convey various forms of information, images, and/or objects. For example, such projections may be a visual overlay for a mobile augmented reality (MAR) application. Under the control of one or more software applications 716, the platform 702 may display user interface 722 on the display 720.

In embodiments, content services device(s) 730 may be hosted by any national, international and/or independent service and thus accessible to the platform 702 via the Internet, for example. The content services device(s) 730 may be coupled to the platform 702 and/or to the display 720. The platform 702 and/or content services device(s) 730 may be coupled to a network 760 to communicate (e.g., send and/or receive) media information to and from network 760. The content delivery device(s) 740 also may be coupled to the platform 702 and/or to the display 720.

In embodiments, the content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

The content services device(s) 730 receives content such as cable television programming including media information, digital information, and/or other content. Examples of content providers may include any cable or satellite television or radio or Internet content providers. The provided examples are not meant to limit embodiments.

In embodiments, the platform 702 may receive control signals from a navigation controller 750 having one or more navigation features. The navigation features of the controller 750 may be used to interact with the user interface 722, for example. In embodiments, the navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of the controller 750 may be echoed on a display (e.g., display 720) by movements of a pointer, cursor, focus ring, or other visual indicators displayed on the display. For example, under the control of software applications 716, the navigation features located on the navigation controller 750 may be mapped to virtual navigation features displayed on the user interface 722, for example. In embodiments, the controller 750 may not be a separate component but integrated into the platform 702 and/or the display 720. Embodiments, however, are not limited to the elements or in the context shown or described herein.

In embodiments, drivers (not shown) may comprise technology to enable users to instantly turn on and off the platform 702 like a television with the touch of a button after initial boot-up, when enabled, for example. Program logic may allow the platform 702 to stream content to media adaptors or other content services device(s) 730 or content delivery device(s) 740 when the platform is turned "off." In addition, chipset 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in the system 700 may be integrated. For example, the platform 702 and the content services device(s) 730 may be integrated, or the platform 702 and the content delivery device(s) 740 may be integrated, or the platform 702, the content services device(s) 730, and the content delivery device(s) 740 may be integrated, for example. In various embodiments, the platform 702 and the display 720 may be an integrated unit. The display 720 and content service device(s) 730 may be integrated, or the display 720 and the content delivery device(s) 740 may be integrated, for example. These examples are not meant to limit the embodiments.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

The platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 15.

Figure 16:
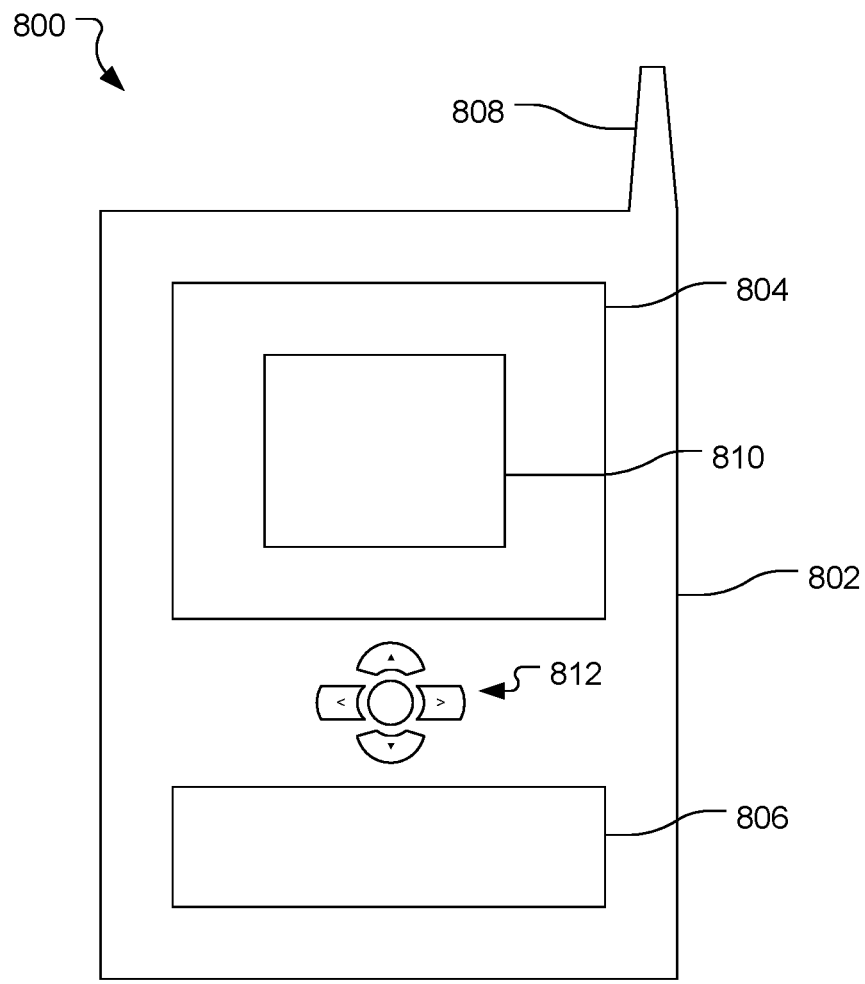
FIG. 16 is a block diagram of an example of a system having a small form factor according to an embodiment.

As described above, the system 700 may be embodied in varying physical styles or form factors. FIG. 16 illustrates embodiments of a small form factor device 800 in which the system 700 may be embodied. In embodiments, for example, the device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 16, the device 800 may comprise a housing 802, a display 804, an input/output (I/O) device 806, and an antenna 808. The device 800 also may comprise navigation features 812. The display 804 may comprise any suitable display unit for displaying information appropriate for a mobile computing device. The I/O device 806 may comprise any suitable I/O device for entering information into a mobile computing device. Examples for the I/O device 806 may include an alphanumeric keyboard, a numeric keypad, a touch pad, input keys, buttons, switches, rocker switches, microphones, speakers, voice recognition device and software, and so forth. Information also may be entered into the device 800 by way of microphone. Such information may be digitized by a voice recognition device. The embodiments are not limited in this context.

In some embodiments, the system 700 and/or the device 800 may include one or more features of the embodiments described herein including a 3D encoder and/or decoder. In particular, the system 700 and/or the device 800 may include one or more aspects of the below Examples.

ADDITIONAL NOTES AND EXAMPLES

Example 1 may include an electronic processing system, comprising a processor, memory communicatively coupled to the processor, and logic communicatively coupled to the processor to store a block of self-contained data including one or more time sequential frames of image data from two or more camera positions, and access a portion of the image data based on a start location and offset information from a header of the block.

Example 2 may include the system of Example 1, wherein the logic is further to construct three-dimensional point clouds from the one or more time sequential frames of image data for each camera position of the two or more camera positions, reproject the three-dimensional point clouds on the two or more camera positions to separate foreground image data from background image data, store the background image data at a pre-determined camera position, and store all of the foreground image data for the two or more camera positions corresponding to a time-aligned frame to one set of image data.

Example 3 may include the system of Example 2, wherein the logic is further to match foreground image data between a first time-aligned frame and a second time-aligned frame, and store the matched foreground image frame at a same position in a first set of image data for the first time-aligned frame and a second set of image data for the second time-aligned frame.

Example 4 may include the system of Example 2, wherein the logic is further to encode foreground color information in the block of self-contained data for each of the two or more camera positions.

Example 5 may include the system of any of Examples 1 to 4, wherein the logic is further to decode the block of self-contained data to build up foreground image data, and reproject the foreground image data on a three-dimensional point cloud based on a virtual camera angle.

Example 6 may include the system of Example 5, wherein the logic is further to determine a closest camera position relative to a viewing angle, and interpolate a color of a scene based on stored foreground color information for the closest camera position and the viewing angle.

Example 7 may include a semiconductor package apparatus, comprising one or more substrates, and logic coupled to the one or more substrates, wherein the logic is at least partly implemented in one or more of configurable logic and fixed-functionality hardware logic, the logic coupled to the one or more substrates to store a block of self-contained data including one or more time sequential frames of image data from two or more camera positions, and access a portion of the image data based on a start location and offset information from a header of the block.

Example 8 may include the apparatus of Example 7, wherein the logic is further to construct three-dimensional point clouds from the one or more time sequential frames of image data for each camera position of the two or more camera positions, reproject the three-dimensional point clouds on the two or more camera positions to separate foreground image data from background image data, store the background image data at a pre-determined camera position, and store all of the foreground image data for the two or more camera positions corresponding to a time-aligned frame to one set of image data.

Example 9 may include the apparatus of Example 8, wherein the logic is further to match foreground image data between a first time-aligned frame and a second time-aligned frame, and store the matched foreground image frame at a same position in a first set of image data for the first time-aligned frame and a second set of image data for the second time-aligned frame.

Example 10 may include the apparatus of Example 8, wherein the logic is further to encode foreground color information in the block of self-contained data for each of the two or more camera positions.

Example 11 may include the apparatus of any of Examples 7 to 10, wherein the logic is further to decode the block of self-contained data to build up foreground image data, and reproject the foreground image data on a three-dimensional point cloud based on a virtual camera angle.

Example 12 may include the apparatus of Example 1, wherein the logic is further to determine a closest camera position relative to a viewing angle, and interpolate a color of a scene based on stored foreground color information for the closest camera position and the viewing angle.

Example 13 may include a method of processing image data, comprising storing a block of self-contained data including one or more time sequential frames of image data from two or more camera positions, and accessing a portion of the image data based on a start location and offset information from a header of the block.

Example 14 may include the method of Example 13, further comprising constructing three-dimensional point clouds from the one or more time sequential frames of image data for each camera position of the two or more camera positions, reprojecting the three-dimensional point clouds on the two or more camera positions to separate foreground image data from background image data, storing the background image data at a pre-determined camera position, and storing all of the foreground image data for the two or more camera positions corresponding to a time-aligned frame to one set of image data.

Example 15 may include the method of Example 14, further comprising matching foreground image data between a first time-aligned frame and a second time-aligned frame, and storing the matched foreground image frame at a same position in a first set of image data for the first time-aligned frame and a second set of image data for the second time-aligned frame.

Example 16 may include the method of Example 14, further comprising encoding foreground color information in the block of self-contained data for each of the two or more camera positions.

Example 17 may include the method of any of Examples 13 to 16, further comprising decoding the block of self-contained data to build up foreground image data, and reprojecting the foreground image data on a three-dimensional point cloud based on a virtual camera angle.

Example 18 may include the method of Example 17, further comprising determining a closest camera position relative to a viewing angle, and interpolating a color of a scene based on stored foreground color information for the closest camera position and the viewing angle.

Example 19 may include at least one computer readable medium, comprising a set of instructions, which when executed by a computing device, cause the computing device to store a block of self-contained data including one or more time sequential frames of image data from two or more camera positions, and access a portion of the image data based on a start location and offset information from a header of the block.

Example 20 may include the at least one computer readable medium of Example 19, comprising a further set of instructions, which when executed by the computing device, cause the computing device to construct three-dimensional point clouds from the one or more time sequential frames of image data for each camera position of the two or more camera positions, reproject the three-dimensional point clouds on the two or more camera positions to separate foreground image data from background image data, store the background image data at a pre-determined camera position, and store all of the foreground image data for the two or more camera positions corresponding to a time-aligned frame to one set of image data.

Example 21 may include the at least one computer readable medium of Example 20, comprising a further set of instructions, which when executed by the computing device, cause the computing device to match foreground image data between a first time-aligned frame and a second time-aligned frame, and store the matched foreground image frame at a same position in a first set of image data for the first time-aligned frame and a second set of image data for the second time-aligned frame.

Example 22 may include the at least one computer readable medium of Example 20, comprising a further set of instructions, which when executed by the computing device, cause the computing device to encode foreground color information in the block of self-contained data for each of the two or more camera positions.

Example 23 may include the at least one computer readable medium of any of Examples 19 to 22, comprising a further set of instructions, which when executed by the computing device, cause the computing device to decode the block of self-contained data to build up foreground image data, and reproject the foreground image data on a three-dimensional point cloud based on a virtual camera angle.

Example 24 may include the at least one computer readable medium of Example 23, comprising a further set of instructions, which when executed by the computing device, cause the computing device to determine a closest camera position relative to a viewing angle, and interpolate a color of a scene based on stored foreground color information for the closest camera position and the viewing angle.

Example 25 may include an image data processing apparatus, comprising means for storing a block of self-contained data including one or more time sequential frames of image data from two or more camera positions, and means for accessing a portion of the image data based on a start location and offset information from a header of the block.

Example 26 may include the apparatus of Example 25, further comprising means for constructing three-dimensional point clouds from the one or more time sequential frames of image data for each camera position of the two or more camera positions, means for reprojecting the three-dimensional point clouds on the two or more camera positions to separate foreground image data from background image data, means for storing the background image data at a pre-determined camera position, and means for storing all of the foreground image data for the two or more camera positions corresponding to a time-aligned frame to one set of image data.

Example 27 may include the apparatus of Example 26, further comprising means for matching foreground image data between a first time-aligned frame and a second time-aligned frame, and means for storing the matched foreground image frame at a same position in a first set of image data for the first time-aligned frame and a second set of image data for the second time-aligned frame.

Example 28 may include the apparatus of Example 26, further comprising means for encoding foreground color information in the block of self-contained data for each of the two or more camera positions.

Example 29 may include the apparatus of any of Examples 25 to 28, further comprising means for decoding the block of self-contained data to build up foreground image data, and means for reprojecting the foreground image data on a three-dimensional point cloud based on a virtual camera angle.

Example 30 may include the apparatus of Example 29, further comprising means for determining a closest camera position relative to a viewing angle, and means for interpolating a color of a scene based on stored foreground color information for the closest camera position and the viewing angle.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An electronic processing system, comprising:
    a processor;
    memory communicatively coupled to the processor; and
    logic communicatively coupled to the processor to:
        store a block of self-contained data including one or more time sequential frames of image data from two or more camera positions, wherein the self-contained data includes all needed types of data per frame,
        access a portion of the image data based on a start location of a header of the block and offset information contained within the header of the block,
        construct three-dimensional point clouds from the one or more time sequential frames of image data for each camera position of the two or more camera positions,
        reproject the three-dimensional point clouds on the two or more camera positions to extract foreground image data, separate foreground image data from background image data,
store the background image data at a pre-determined camera position, and
store all of the foreground image data for the two or more camera positions corresponding to a time-aligned frame to one set of image data.

2. The system of claim 1, wherein the logic is further to:
match foreground image data between a first time-aligned frame and a second time-aligned frame; and
store the matched foreground image frame at a same position in a first set of image data for the first time-aligned frame and a second set of image data for the second time-aligned frame.

3. The system of claim 1, wherein the logic is further to:
encode foreground color information in the block of self-contained data for each of the two or more camera positions.

4. An electronic processing system, comprising:
a processor;
memory communicatively coupled to the processor; and
logic communicatively coupled to the processor to:
   store a block of self-contained data including one or more time sequential frames of image data from two or more camera positions, wherein the self-contained data includes all needed types of data per frame,
   access a portion of the image data based on a start location of a header of the block and offset information contained within the header of the block,
   decode the block of self-contained data to build up foreground image data, and
   reproject the foreground image data on a three-dimensional point cloud based on a virtual camera angle to render a scene.

5. The system of claim 4, wherein the logic is further to:
determine a closest camera position relative to a viewer perspective; and
interpolate a color of a scene based on stored foreground color information for the closest camera position and the virtual camera angle.

6. A semiconductor package apparatus, comprising:
one or more substrates; and
logic coupled to the one or more substrates, wherein the logic is at least partly implemented in one or more of configurable logic and fixed-functionality hardware logic, the logic coupled to the one or more substrates to:
   store a block of self-contained data including one or more time sequential frames of image data from two or more camera positions, wherein the self-contained data includes all needed types of data per frame,
   access a portion of the image data based on a start location of a header of the block and offset information contained within the header of the block,
   construct three-dimensional point clouds from the one or more time sequential frames of image data for each camera position of the two or more camera positions,
   reproject the three-dimensional point clouds on the two or more camera positions to extract foreground image data,
   separate foreground image data from background image data,
   store the background image data at a pre-determined camera position, and
   store all of the foreground image data for the two or more camera positions corresponding to a time-aligned frame to one set of image data.

7. The apparatus of claim 6, wherein the logic is further to:
match foreground image data between a first time-aligned frame and a second time-aligned frame; and
store the matched foreground image frame at a same position in a first set of image data for the first time-aligned frame and a second set of image data for the second time-aligned frame.

8. The apparatus of claim 6, wherein the logic is further to:
encode foreground color information in the block of self-contained data for each of the two or more camera positions.

9. A semiconductor package apparatus, comprising:
one or more substrates; and
logic coupled to the one or more substrates, wherein the logic is at least partly implemented in one or more of configurable logic and fixed-functionality hardware logic, the logic coupled to the one or more substrates to:
   store a block of self-contained data including one or more time sequential frames of image data from two or more camera positions, wherein the self-contained data includes all needed types of data per frame,
   access a portion of the image data based on a start location of a header of the block and offset information contained within the header of the block,
   decode the block of self-contained data to build up foreground image data, and
   reproject the foreground image data on a three-dimensional point cloud based on a virtual camera angle to render a scene.

10. The apparatus of claim 9, wherein the logic is further to:
determine a closest camera position relative to a viewer perspective; and
interpolate a color of a scene based on stored foreground color information for the closest camera position and the virtual camera angle.

11. A method of processing image data, comprising:
storing a block of self-contained data including one or more time sequential frames of image data from two or more camera positions, wherein the self-contained data includes all needed types of data per frame;
accessing a portion of the image data based on a start location of a header of the block and offset information contained within the header of the block;
constructing three-dimensional point clouds from the one or more time sequential frames of image data for each camera position of the two or more camera positions;
reprojecting the three-dimensional point clouds on the two or more camera positions to extract foreground image data;
separating foreground image data from background image data;
storing the background image data at a pre-determined camera position; and
storing all of the foreground image data for the two or more camera positions corresponding to a time-aligned frame to one set of image data.

12. The method of claim 11, further comprising:
matching foreground image data between a first time-aligned frame and a second time-aligned frame; and
storing the matched foreground image frame at a same position in a first set of image data for the first time-aligned frame and a second set of image data for the second time-aligned frame.

13. The method of claim 11, further comprising:
encoding foreground color information in the block of self-contained data for each of the two or more camera positions.

14. A method of processing image data, comprising:
storing a block of self-contained data including one or more time sequential frames of image data from two or more camera positions, wherein the self-contained data includes all needed types of data per frame;
accessing a portion of the image data based on a start location of a header of the block and offset information contained within the header of the block;
decoding the block of self-contained data to build up foreground image data; and
reprojecting the foreground image data on a three-dimensional point cloud based on a virtual camera angle to render a scene.

15. The method of claim 14, further comprising:
determining a closest camera position relative to a viewer perspective; and
interpolating a color of a scene based on stored foreground color information for the closest camera position and the virtual camera angle.

16. At least one non-transitory computer readable medium, comprising a set of instructions, which when executed by a computing device, cause the computing device to:
store a block of self-contained data including one or more time sequential frames of image data from two or more camera positions, wherein the self-contained data includes all needed types of data per frame;
access a portion of the image data based on a start location of a header of the block and offset information contained within the header of the block;
construct three-dimensional point clouds from the one or more time sequential frames of image data for each camera position of the two or more camera positions;
reproject the three-dimensional point clouds on the two or more camera positions to extract foreground image data;
separate foreground image data from background image data;
store the background image data at a pre-determined camera position; and
store all of the foreground image data for the two or more camera positions corresponding to a time-aligned frame to one set of image data.

17. The at least one non-transitory computer readable medium of claim 16, comprising a further set of instructions, which when executed by the computing device, cause the computing device to:
match foreground image data between a first time-aligned frame and a second time-aligned frame; and
store the matched foreground image frame at a same position in a first set of image data for the first time-aligned frame and a second set of image data for the second time-aligned frame.

18. The at least one non-transitory computer readable medium of claim 16, comprising a further set of instructions, which when executed by the computing device, cause the computing device to:
encode foreground color information in the block of self-contained data for each of the two or more camera positions.

19. At least one non-transitory computer readable medium, comprising a set of instructions, which when executed by a computing device, cause the computing device to:
store a block of self-contained data including one or more time sequential frames of image data from two or more camera positions, wherein the self-contained data includes all needed types of data per frame;
access a portion of the image data based on a start location of a header of the block and offset information contained within the header of the block;
decode the block of self-contained data to build up foreground image data; and
reproject the foreground image data on a three-dimensional point cloud based on a virtual camera angle to render a scene.

20. The at least one non-transitory computer readable medium of claim 19, comprising a further set of instructions, which when executed by the computing device, cause the computing device to:
determine a closest camera position relative to a viewer perspective; and
interpolate a color of a scene based on stored foreground color information for the closest camera position and the virtual camera angle.

* * * * *